(12) United States Patent
Takemoto et al.

(10) Patent No.: US 12,542,146 B2
(45) Date of Patent: Feb. 3, 2026

(54) SOUND PROCESSING METHOD, SOUND PROCESSING APPARATUS AND SOUND PROCESSING SYSTEM

(71) Applicant: YAMAHA CORPORATION, Hamamatsu (JP)

(72) Inventors: Takuma Takemoto, Hamamatsu (JP); Katsumi Ishikawa, Hamamatsu (JP); Akio Ohtani, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 253 days.

(21) Appl. No.: 18/366,865

(22) Filed: Aug. 8, 2023

(65) Prior Publication Data

US 2023/0386495 A1  Nov. 30, 2023

Related U.S. Application Data

(63) Continuation of application No. PCT/JP2022/000219, filed on Jan. 6, 2022.

(30) Foreign Application Priority Data

Feb. 18, 2021  (JP) .................................. 2021-024161

(51) Int. Cl.
| | |
|---|---|
| G10L 21/028 | (2013.01) |
| G10L 25/51 | (2013.01) |
| H04R 5/033 | (2006.01) |

(52) U.S. Cl.
CPC ............ *G10L 21/028* (2013.01); *G10L 25/51* (2013.01); *H04R 5/033* (2013.01)

(58) Field of Classification Search
CPC ........ G10L 21/028; G10L 25/51; H04R 5/033
See application file for complete search history.

(56) References Cited

U.S. PATENT DOCUMENTS

| | | | | |
|---|---|---|---|---|
| 2015/0382123 | A1* | 12/2015 | Jobani ................. | H04R 1/1016 |
| | | | | 700/98 |
| 2019/0007780 | A1* | 1/2019 | Sheaffer .................... | G06T 7/20 |

(Continued)

FOREIGN PATENT DOCUMENTS

| | | |
|---|---|---|
| JP | 2010231218 A | 10/2010 |
| JP | 2014167575 A | 9/2014 |
| WO | 2018088450 A1 | 5/2018 |

OTHER PUBLICATIONS

International Search Report issued in Intl. Appln. No. PCT/JP2022/000219 mailed Mar. 29, 2022. English translation provided.

(Continued)

*Primary Examiner* — Bhavesh M Mehta
*Assistant Examiner* — Joseph J. Yamamoto
(74) *Attorney, Agent, or Firm* — ROSSI, KIMMS & McDOWELL LLP

(57) ABSTRACT

A sound processing method obtains first audio data representing first sound, obtains second audio data representing second sound created in advance, analyzes the first audio data, compares the second audio data with an analysis result of the analyzing, reproduces third audio data from the second audio data by omitting a type of sound from the second sound that matches a type of sound in the first sound, based on a comparison result of the comparing, and outputs an audio signal representing the reproduced third audio data.

15 Claims, 15 Drawing Sheets

(56) References Cited

U.S. PATENT DOCUMENTS

2019/0261123 A1 8/2019 Usui et al.
2022/0246146 A1* 8/2022 Nouri ................... G06N 3/0442

OTHER PUBLICATIONS

Written Opinion issued in Intl. Appln. No. PCT/JP2022/000219 mailed Mar. 29, 2022.
Office Action issued in Japanese Appln. No. 2021-024161 mailed Mar. 11, 2025.
Office Action issued in Japanese Appln. No. 2021-024161, mailed on Dec. 24, 2024. English machine translation provided.
English translation of Written Opinion issued in Intl. Appln. No. PCT/JP2022/000219, mailed on Mar. 29, 2022, previously cited in IDS filed Aug. 8, 2023.
International Preliminary Report on Patentability issued in Intl. Appln. No. PCT/JP2022/000219 on Aug. 22, 2023. English translation provided.

* cited by examiner

Fig.9
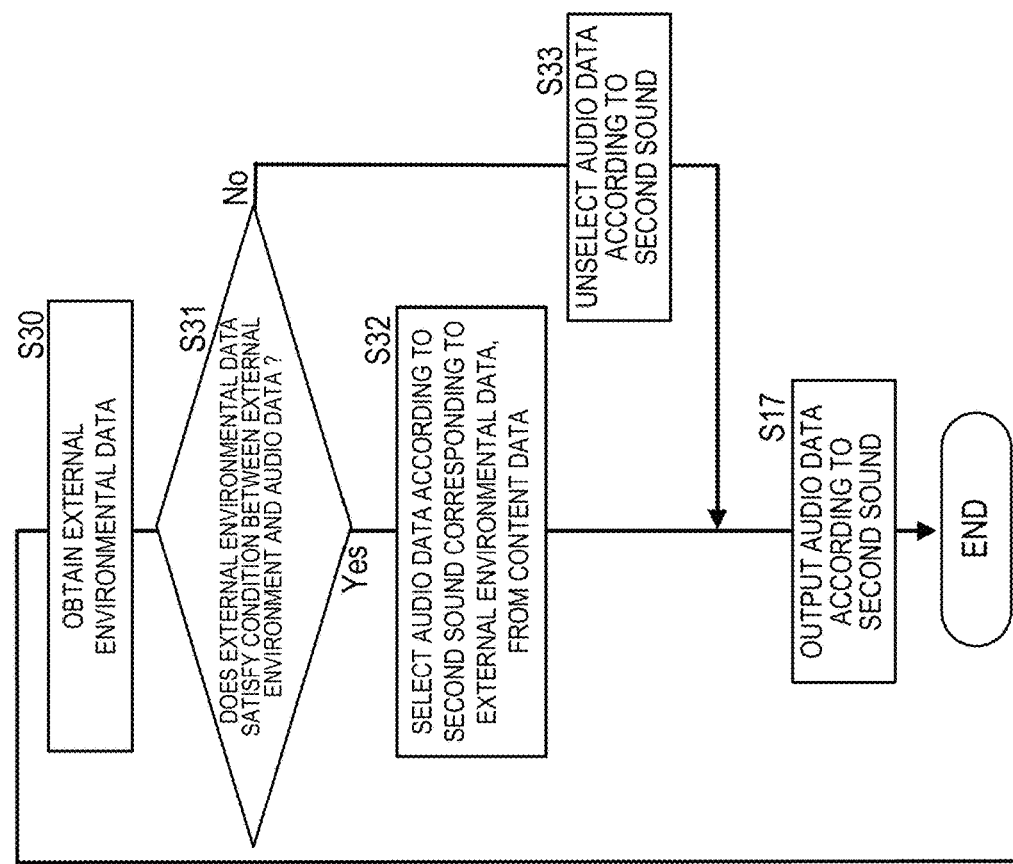
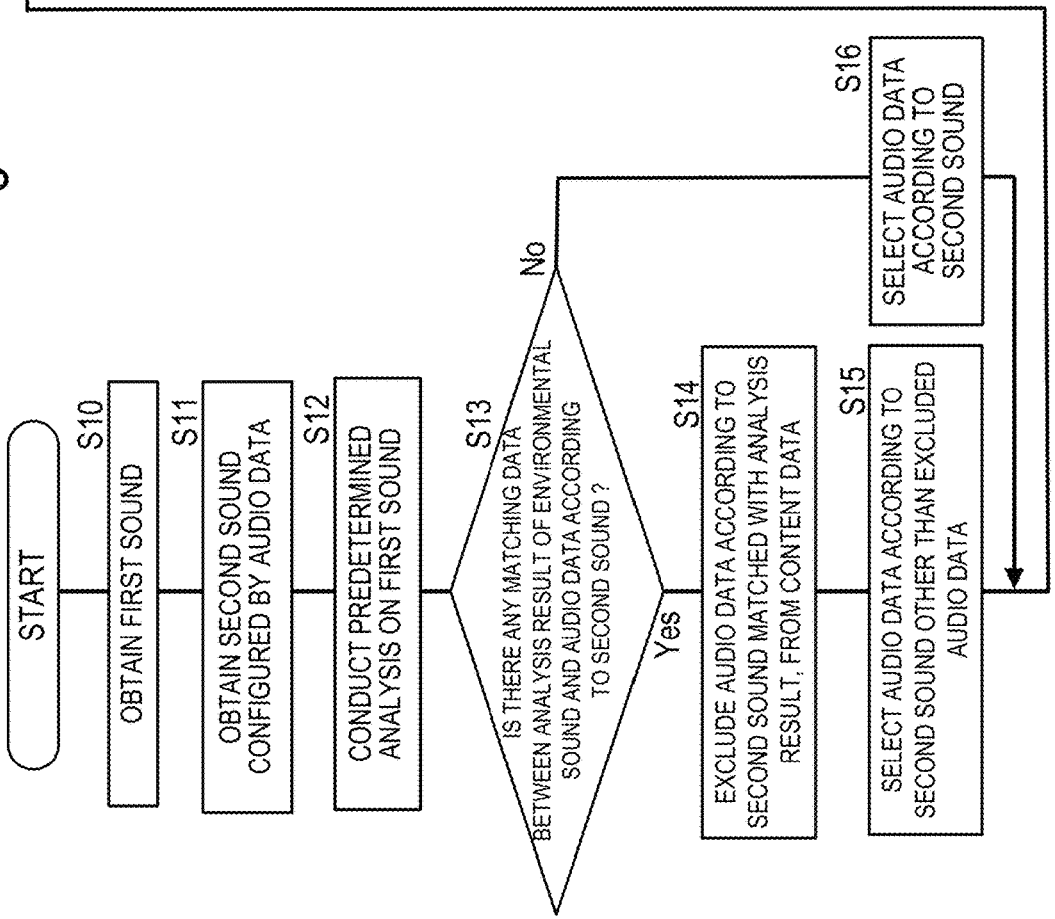

Fig.13
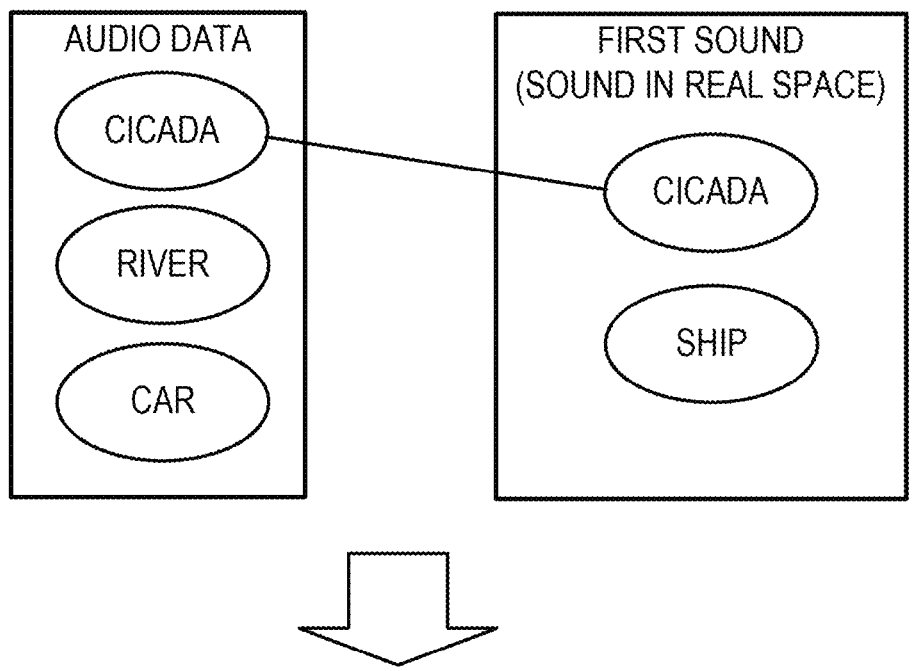
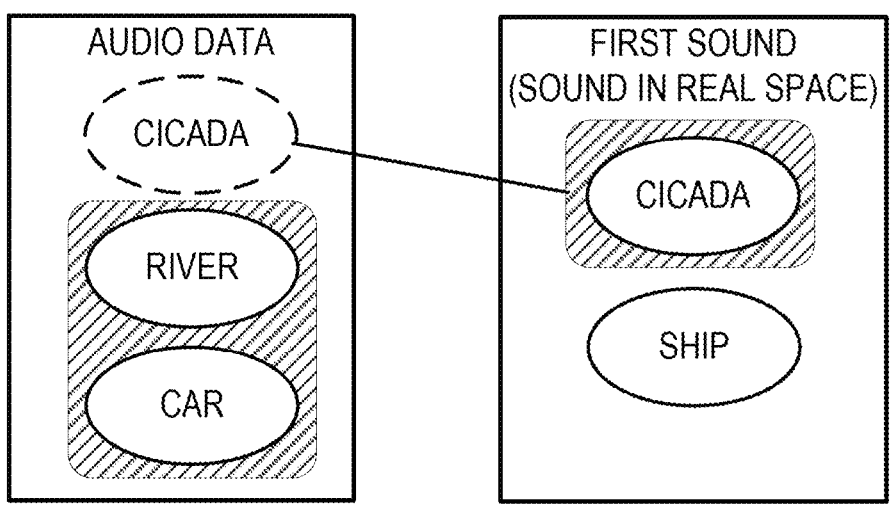

SOUND PROCESSING METHOD, SOUND PROCESSING APPARATUS AND SOUND PROCESSING SYSTEM

CROSS-REFERENCE TO RELATED APPLICATIONS

This application is a continuation of PCT Application No. PCT/JP2022/000219, filed on Jan. 6, 2022, which claims priority to Japanese Application No. 2021-024161, filed on Feb. 18, 2021. The contents of these applications are incorporated herein by reference in their entirety.

BACKGROUND

Technical Field

An embodiment of the present disclosure relates to a sound processing method, a sound processing apparatus and a sound processing system.

Background Information

International Publication No. 2018/088450 discloses a speech reproducing device including a detecting section that detects a direction that a user is facing in relation to a specific area and a detecting section that detects a positional relationship between the specific area and the user. The speech reproducing device disclosed in International Publication No. 2018/088450 changes a sound to be reproduced, based on the positional relationship between the direction that the user is facing and the specific area and the user. As a result, the speech reproducing device facilitates the user to imagine an impression of the specific area.

A method that allows a user to listen to sound with a more immersive experience without a sense of discomfort is desired.

SUMMARY

In view of the foregoing, an embodiment of the present disclosure is directed to provide a sound processing method that allows a user to listen to sound with a more immersive experience without a sense of discomfort.

A sound processing method according to an embodiment of the present disclosure obtains first audio data representing first sound, obtains second audio data representing second sound created in advance, analyzes the first audio data, compares the second audio data with an analysis result of the analyzing, reproduces third audio data from the second audio data by omitting a type of sound from the second sound that matches a type of sound in the first sound, based on a comparison result of the comparing, and outputs an audio signal representing the reproduced third audio data.

According to an embodiment of the present disclosure, a user can listen to sound with a more immersive experience without a sense of discomfort.

BRIEF DESCRIPTION OF THE DRAWINGS

FIG. 5 is a view showing an example of an analysis in an analyzer 200a.

FIG. 9 shows an image of an operation of the sound processing apparatus 1b according to the third embodiment.

FIG. 13 is a view showing an example of an output of a first sound and reproduction of audio data.

DETAILED DESCRIPTION

First Embodiment

Figure 1:
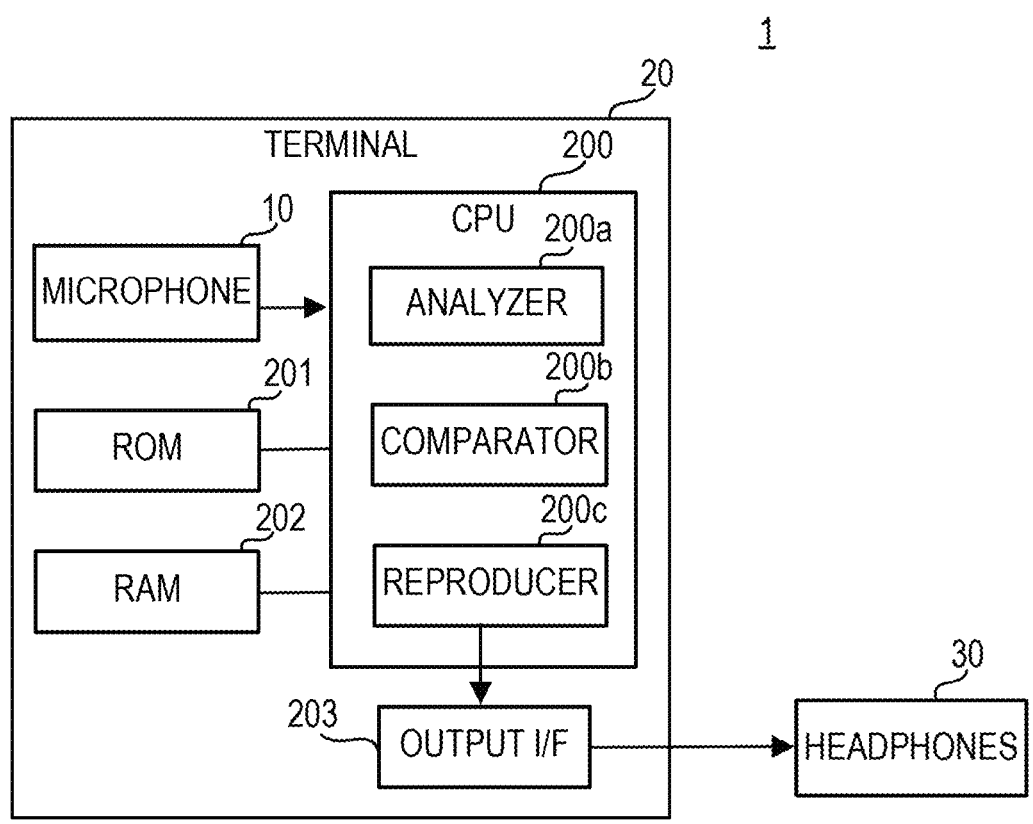
FIG. 1 is a block diagram showing an example of a main configuration of a sound processing apparatus 1 according to a first embodiment of the present disclosure.
Figure 2:
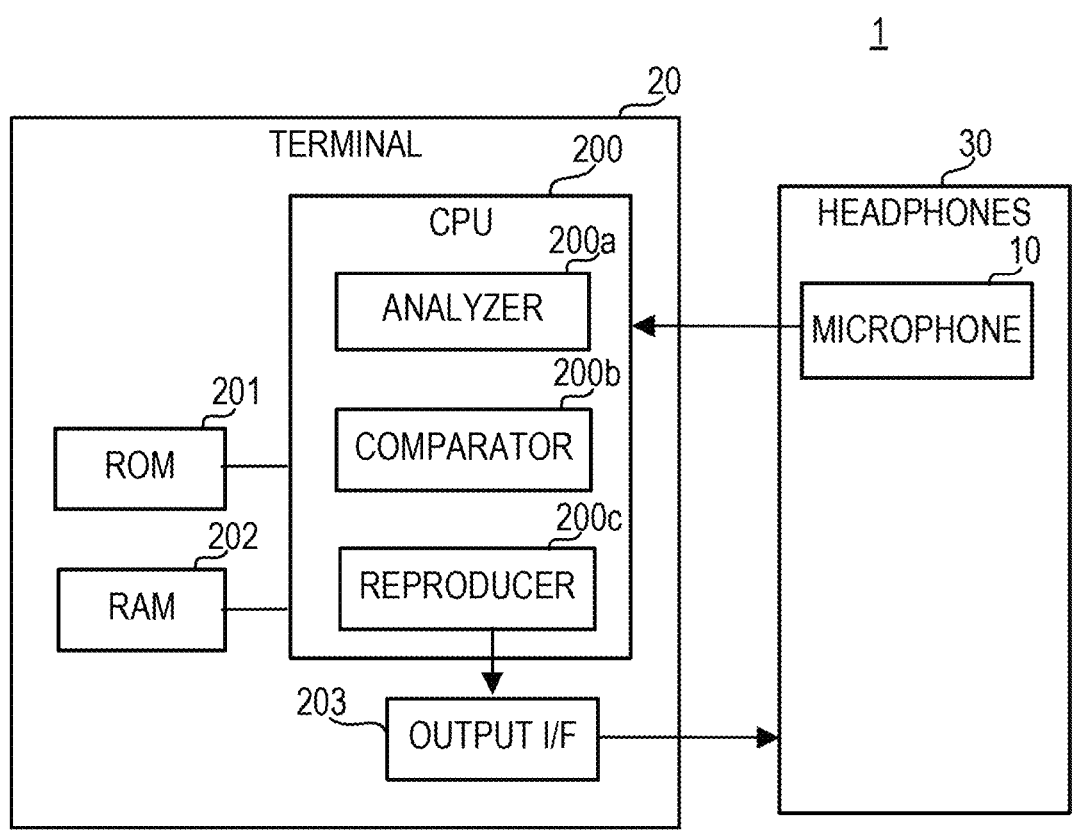
FIG. 2 is a block diagram showing an example of a main configuration of the sound processing apparatus 1 according to the first embodiment, and is a diagram showing a different example from FIG. 1.
Figure 3:
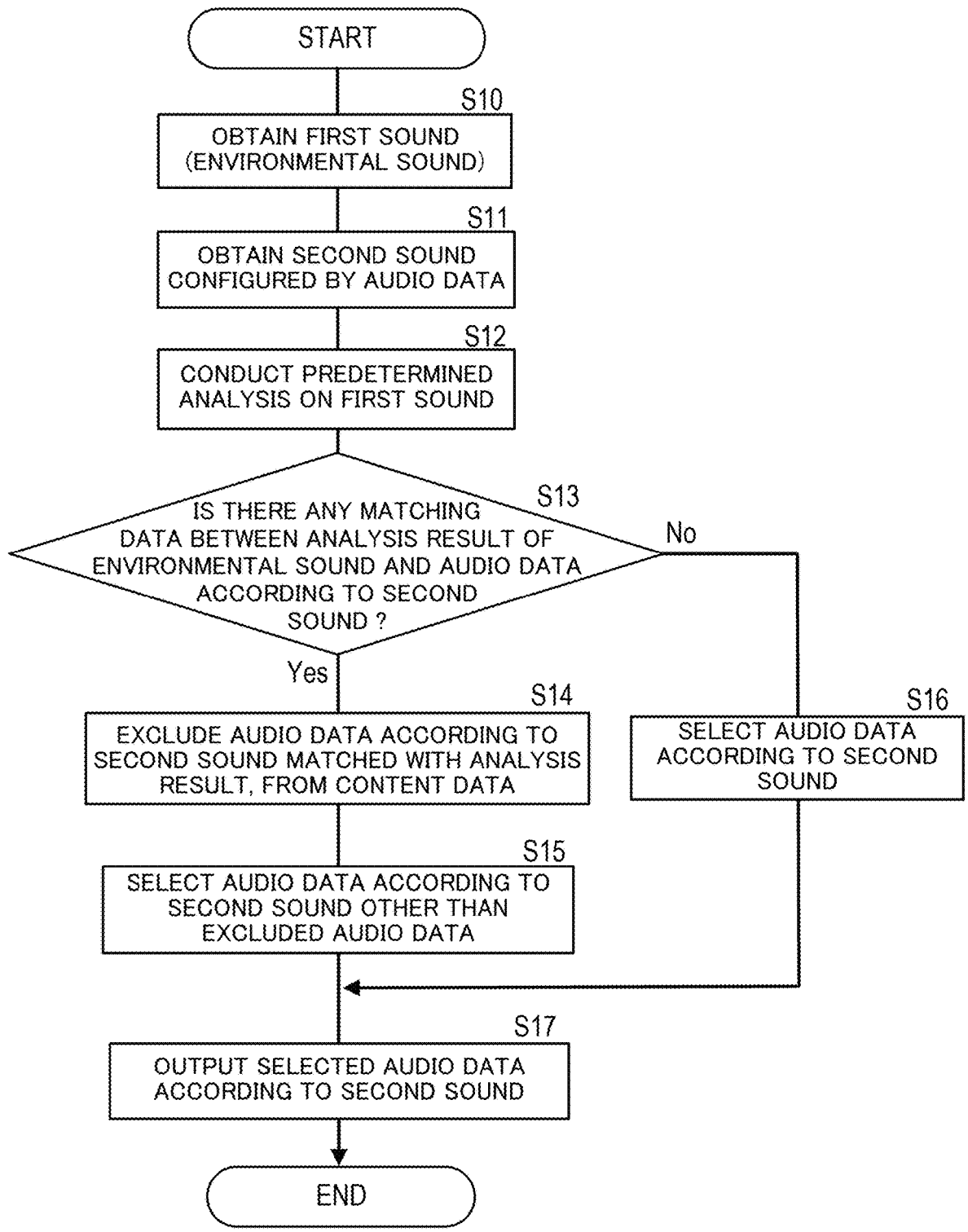
FIG. 3 is a flow chart showing an example of an operation of the sound processing apparatus 1 according to the first embodiment.
Figure 4:
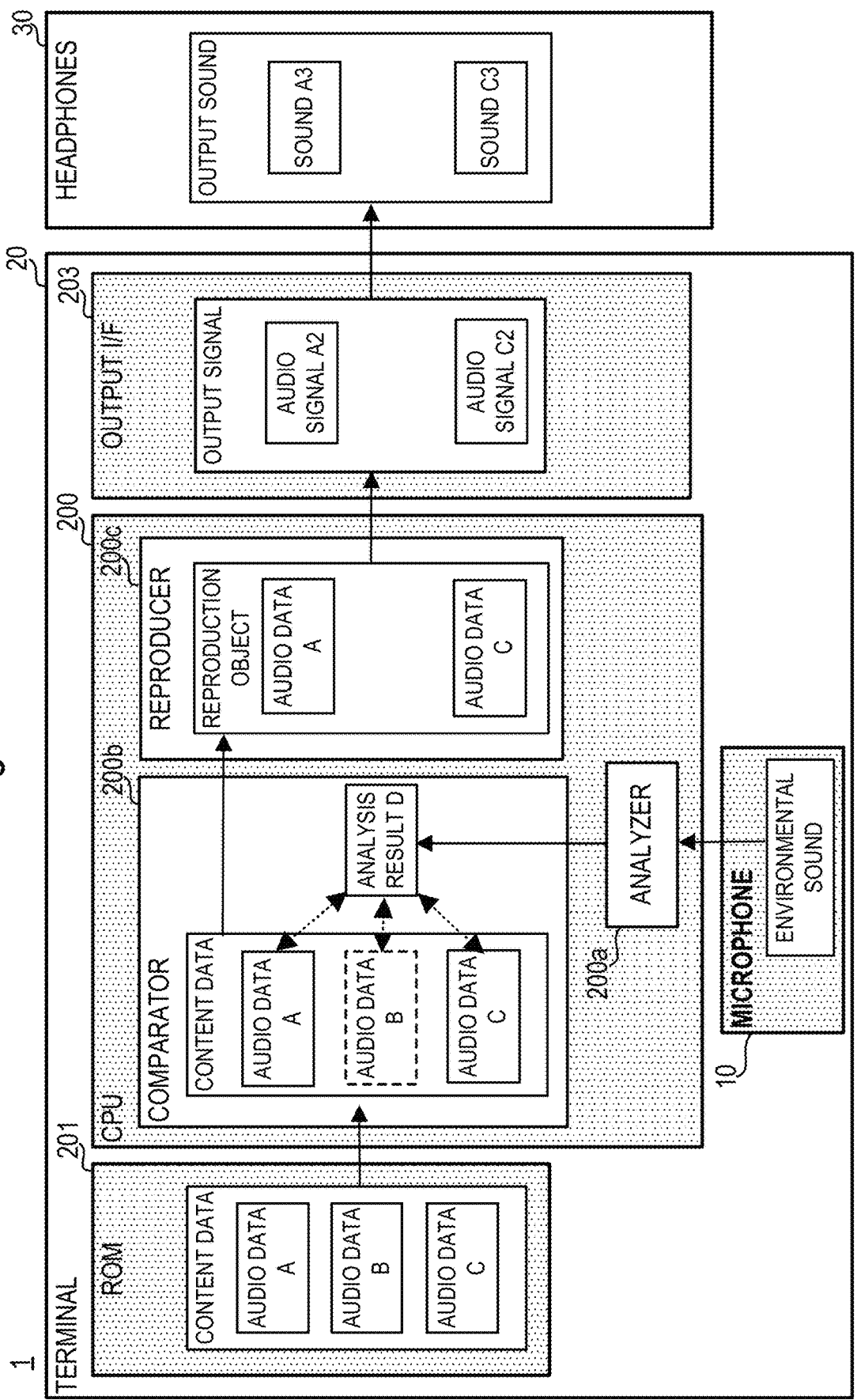
FIG. 4 is a view showing an example of movement of audio data in the sound processing apparatus 1 according to the first embodiment.
Figure 5:
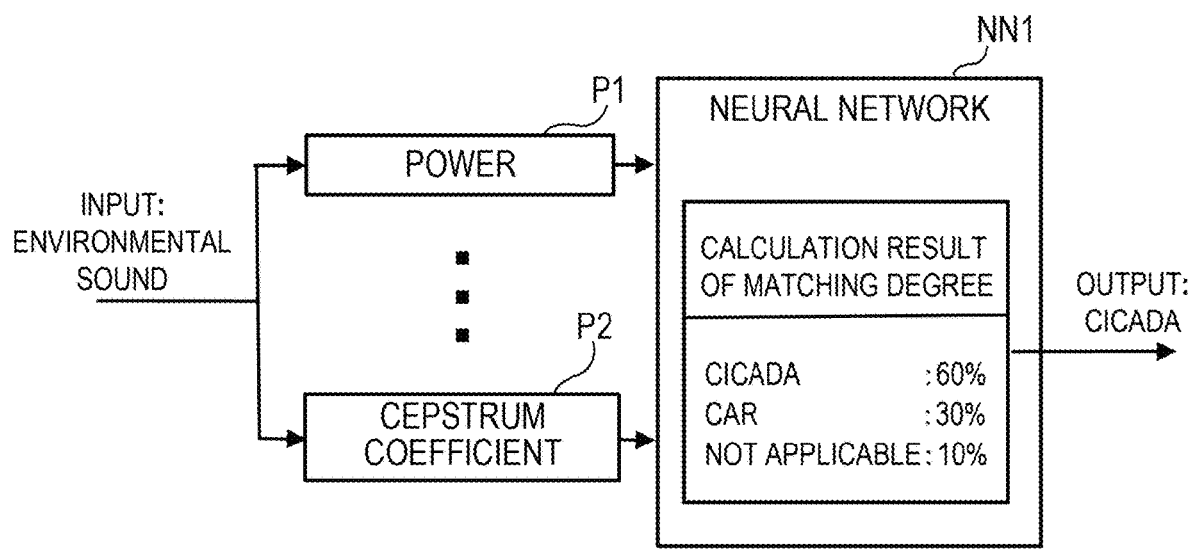

Hereinafter, a sound processing apparatus 1 according to a first embodiment of the present disclosure will be described with reference to the drawings. FIG. 1 is a block diagram showing an example of a main configuration of the sound processing apparatus 1 according to the first embodiment. FIG. 2 is a block diagram showing an example of a main configuration of the sound processing apparatus 1 according to the first embodiment, and is a diagram showing a different example from FIG. 1. FIG. 3 is a flow chart showing an example of an operation of the sound processing apparatus 1 according to the first embodiment. FIG. 4 is a view showing an example of movement of audio data in the sound processing apparatus 1 according to the first embodiment. FIG. 5 is a view showing an example of an analysis in an analyzer 200a.

As shown in FIG. 1, the sound processing apparatus 1 includes a terminal 20 and headphones 30. The terminal 20 includes a microphone 10, a CPU 200, a ROM 201, a RAM 202, and an output I/F 203. The terminal 20 and the headphones 30 are connected to each other through a wired or wireless connection. It is to be noted that, as shown in FIG. 2, the headphones 30 may include the microphone 10. In other words, the headphones 30 may be a headset.

The microphone 10 obtains environmental sound (in other words, environmental sound around a user) around a location in which the microphone 10 is installed. The microphone 10 converts obtained environmental sound into an audio signal. The microphone outputs the audio signal obtained by conversion to the CPU 200 of the terminal 20. The environmental sound includes the engine sound of a car and the sound of thunder, for example. The environmental sound around the location in which the microphone 10 is installed corresponds to a first sound. In addition, the microphone 10 corresponds to a first sound obtainer in the present disclosure.

The terminal 20 stores audio data created in advance on another PC or the like by a maker (hereinafter referred to as a creator) of content. The terminal 20 is, for example, a portable device such as a smartphone. In such a case, the microphone 10 is a built-in microphone included in a smartphone or the like. The terminal 20 corresponds to a second sound obtainer in the present disclosure.

The audio data is data in which a specific sound is recorded. The specific sound includes the sound of waves, and the sound of buzz of a cicada, for example. That is to say, the audio data includes data to which sound source information (second sound source information in the present embodiment) that shows the type of the sound source (a second sound source in the present embodiment) is added in advance. The terminal 20 stores the audio data as multitrack content data including a track. For example, the terminal 20 stores multitrack content data including two tracks of the audio data of the sound of waves and the audio data of the buzz of a cicada. The audio data (content data) created by a creator corresponds to a second sound in the present embodiment. That is to say, the second sound is configured by audio data. Hereinafter, the audio data that is set through the terminal 20 is referred to as audio data according to the second sound.

The creator creates content to provide a user a specific impression. For example, the creator, when desiring to create content that give a user the impression of summer, creates audio data such as the sound of waves or the sound of buzz of a cicada, which are sound related to summer.

The ROM 201 stores various types of data. The various types of data include a program that operates the terminal 20, environmental sound data inputted from the microphone 10, or content data received from another PC or the like, for example.

The RAM 202 temporarily stores predetermined data stored in the ROM 201.

The CPU 200 controls an operation of the terminal 20. The CPU 200 performs various types of operations by reading a predetermined program stored in the ROM 201, to the RAM 202. The CPU 200 includes an analyzer 200a, a comparator 200b, and a reproducer 200c. The CPU 200 performs various types of processing on an inputted first sound (environmental sound). The various types of processing include analysis processing of the analyzer 200a, a comparison processing of the comparator 200b, and reproduction processing of the reproducer 200c, in the CPU 200. In other words, the CPU 200 executes a program including a program of the analysis processing of the analyzer 200a, a program of the comparison processing of the comparator 200b, and a program of the reproduction processing of the reproducer 200c.

The analyzer 200a performs predetermined analysis processing on data according to the environmental sound. In other words, the analyzer 200a analyzes a first sound. The predetermined analysis processing in the analyzer 200a is, for example, sound source recognition processing by artificial intelligence such as a neural network. In such a case, the analyzer 200a calculates a feature amount of the environmental sound, based on data according to inputted environmental sound. The feature amount is a parameter that shows the feature of a sound source. For example, the feature amount includes at least power or a cepstrum coefficient. The power is the power of an audio signal. The cepstrum coefficient is a logarithm of the amplitude of the discrete cosine transform of the audio signal on a frequency axis. It is to be noted that a sound feature amount is not limited only to power and a cepstrum coefficient.

The analyzer 200a recognizes (estimates the type of a sound source) a sound source based on the feature amount of a sound source. For example, in a case in which the feature amount of buzz of a cicada is included in the environmental sound, the analyzer 200a recognizes the type of the sound source as the buzz of a cicada. The analyzer 200a, as shown in FIG. 4, outputs an analysis result D (a recognition result of a sound source) to the comparator 200b. For example, in a case in which the analyzer 200a recognizes that "the sound source is the buzz of a cicada," the analyzer 200a outputs the analysis result D that "the sound source is the buzz of a cicada," to the comparator 200b. That is to say, the analysis result D includes sound source information (being first sound source information in the present embodiment) that shows the type of a sound source (being a first sound source in the present embodiment) included in the environmental sound being the first sound.

Herein, a case in which the analyzer 200a performs sound source recognition processing by use of the neural network will be described in detail. Hereinafter, as shown in FIG. 5, a case in which the analyzer 200a uses a neural network NN1 will be described as an example.

The terminal 20, in a case of inputting the feature amount of a sound source, has a learned neural network NN1 that outputs the type of a sound source. As shown in FIG. 5, the neural network NN1 recognizes a sound source based on a plurality of sound feature amounts. As shown in FIG. 5, the sound feature amount that the neural network NN1 uses for the sound source recognition processing is, for example, a power P1, a cepstrum coefficient P2, or the like. The neural network NN1 outputs degree of matching of the feature amount of each sound source with respect to various types of the feature amount of the environmental sound. Then, the neural network NN1 outputs the type of a sound source with the highest degree of matching as the analysis result D.

In more detail, first, a learned model that the neural network NN1 has and that has learned (has completed parameter tuning such as weighting in artificial intelligence, for example) a data set showing a relationship between information (hereinafter referred to as third sound source information) that shows the type of a sound source and the feature amount of a third sound source as learned data is prepared. Then, the neural network NN1 inputs the feature amount included in the first sound calculated in the analysis of the first sound, into the learned model. The neural network NN1, after inputting the feature amount into the learned model, outputs information on the type of a sound source corresponding to inputted feature amount, as an analysis result. For example, the neural network NN1 outputs the degree of matching of the environmental sound and a learned sound source, based on the feature amount of the inputted environmental sound. Then, the neural network NN1 outputs information (label information on a cicada, for example) on the type of a sound source with the highest degree of matching, in each learned sound source, to the comparator 200b.

For example, as shown in FIG. 5, the neural network NN1 calculates each of the degree of matching of the environmental sound and the buzz of a cicada and the degree of matching of the environmental sound and the engine sound of a car. In the example shown in FIG. 5, the neural network NN1 calculates a probability of 60% that the environmental sound matches the buzz of a cicada, and a probability of 30% that the environmental sound matches the engine sound of a car. At this time, a probability that the environmental sound matches no recognition data is also calculated. In the example shown in FIG. 5, the neural network NN1 calculates a probability of 10% that the environmental sound matches neither the buzz of a cicada nor the engine sound of a car. In a case of the above calculation result, the type of a sound source with the highest degree of matching is the buzz of a cicada. Accordingly, the neural network NN1 outputs the analysis result D that "the sound source is the buzz of a cicada." In this manner, the neural network NN1 is able to estimate (recognize the sound source) the type of a sound source that matches the environmental sound when the feature amount of a sound source is inputted. It is to be noted that the type of a sound source being an output target is designated in advance by a creator or the like.

It is to be noted that the method of recognizing the type of a sound source is not limited to the method that uses the neural network. For example, the analyzer 200a may perform matching that compares the waveforms of audio signals with each other. In such a case, the terminal 20 records in advance waveform data (template data) for each type of a sound source as recognition data. Then, the analyzer 200a determines whether or not the waveform of the environmental sound matches the template data. The analyzer 200a, in a case of determining that the template data matches the waveform of the environmental sound, recognizes the environmental sound as a sound source of the type of the template data. For example, in a case in which the waveform of the buzz of a cicada is recorded in the terminal 20 as the template data, the analyzer 200a determines whether the waveform of the environmental sound matches the waveform of the buzz of a cicada. The analyzer 200a, in a case of determining matching, outputs the analysis result D that the environmental sound is the buzz of a cicada. It is to be noted that the matching in the analyzer 200a is not limited only to the method of comparing the waveform data with each other. For example, the analyzer 200a may perform matching that compares the feature amounts of a sound source with each other. In such a case, the terminal 20 records in advance the feature amount (such as power, a cepstrum coefficient, or the like) of a sound source as the recognition data. Then, the analyzer 200a determines whether or not the feature amount of the environmental sound matches the feature amount of a sound source.

The comparator 200b, as shown in FIG. 4, performs comparison processing between the analysis result D and audio data according to the second sound. The information (the information that the audio data is the buzz of a cicada, for example) that shows the type of a sound source is added to the audio data according to the second sound. As shown in FIG. 4, the comparator 200b compares the analysis result D of the analyzer 200a with the information that shows the type of a sound source added to each audio data. Then, in a case in which the analysis result D matches the audio data according to the second sound (specifically, in a case in which the environmental sound and the audio data according to the second sound are the same type of a sound source), the comparator 200b excludes audio data according to the second sound that matches the environmental sound from a reproduction object. For example, in a case in which the analysis result D is a result that "the environmental sound is the buzz of a cicada" and in a case in which the audio data is the buzz of a cicada, the comparator 200b excludes the audio data of the buzz of a cicada from the reproduction object. Then, the comparator 200b outputs audio data other than excluded audio data to the reproducer 200c. In other words, the audio data according to the second sound that matches the analysis result D is not outputted to the reproducer 200c. It is to be noted that exclusion in the comparator 200b distinguishes the audio data to be outputted to the reproducer 200c and the audio data that is not outputted. Accordingly, the exclusion does not mean deletion of audio data from the terminal 20. It is to be noted that, in the present disclosure, the audio data according to the second sound of which the type matches the first sound is second audio data excluded from the reproduction object as a result of the comparison processing. It is to be noted that the audio data according to the second sound of which the type does not match the first sound is second audio data that is not excluded from the reproduction object as the result of the comparison processing. In other words, the audio data according to the second sound is divided into audio data according to the second sound of which the type matches the first sound and audio data according to the second sound of which the type does not match the first sound.

It is to be noted that "matching between the audio data according to the first sound and the second sound" in the present embodiment refers to matching between information on the type of the environmental sound that is outputted by the analyzer 200a and the information on the type of the audio data. For example, in a case in which the analyzer 200a recognizes that type information on the environmental sound by use of the neural network or the like is "the buzz of a cicada," the type information on the first sound is "the buzz of a cicada." At this time, in a case in which "the buzz of the cicada" is recorded in type information on the audio data according to the second sound, the audio data according to the first sound and the audio data according to the second sound are estimated to match with each other. However, the comparator 200b, in a case in which at least a part of the feature amounts matches, may determine that the audio data according to the first sound matches the audio data according to the second sound.

The reproducer 200c receives an input of the audio data according to the second sound from the comparator 200b. The reproducer 200c decodes the audio data according to the second sound. Then, the reproducer 200c outputs decoded audio data according to the second sound as an audio signal, to the output I/F 203. The output I/F 203 may include an audio terminal, a USB terminal, and a communication I/F, for example. The output I/F 203 corresponds to an outputter in the present disclosure. The output I/F 203 that receives an input of an audio signal outputs the audio signal to the headphones 30.

The headphones 30 output the audio signal inputted from the output I/F 203, as sound. The headphones 30 are, for example, headphones that a user owns. The user listens to the sound on the basis of the audio signal according to the second sound through the headphones 30. It is to be noted that the headphones 30 in the present embodiment are devices that emits sound from a sounding body (a speaker or the like) adjacent to the ear of a person. Accordingly, in the present embodiment, the headphones 30 are, for example, devices such as a bone-conduction earphone and an over-the-shoulder speaker.

Hereinafter, a series of processing of the sound processing apparatus 1 will be described with reference to FIG. 3 and FIG. 4. FIG. 3 is a flow chart showing an example of an operation of the sound processing apparatus 1. FIG. 4 is a view showing movement of audio data in the sound processing apparatus 1. It is to be noted that, in FIG. 4, the excluded audio data is indicated by a rectangle of dotted lines. It is to be noted that, in FIG. 4, comparison between the environmental sound data and the audio data according to the second sound in the comparator 200*b* is indicated by a double-headed arrow. It is to be noted that, in FIG. 4, illustration of the RAM 202 and the output I/F 203 are omitted.

First, the microphone 10 obtains environmental sound (the first sound) around a user (FIG. 3: S10). The microphone 10 converts obtained environmental sound into an audio signal. The microphone 10 outputs the audio signal obtained by conversion to the analyzer 200*a* of the terminal 20.

Next, the terminal 20 obtains content data (the second sound) configured by audio data (FIG. 3: S11). The obtained content data is stored in the ROM 201. In the example shown in FIG. 4, audio data A, audio data B, and audio data C are stored in the ROM 201 as content data.

Next, the analyzer 200*a* conducts a predetermined analysis on the obtained environmental sound (FIG. 3: S12). The analysis result of the environmental sound is outputted to the comparator 200*b*. In the example shown in FIG. 4, the analyzer 200*a* outputs data being the analysis result D, as the analysis result of the environmental sound, to the comparator 200*b*.

Next, the comparator 200*b* reads content data from the ROM 201. In the example shown in FIG. 4, the comparator 200*b* reads the audio data A, the audio data B, and the audio data C, from the ROM 201.

Next, the comparator 200*b* performs comparison between the analysis result of the environmental sound according to the first sound, and content data (the audio data according to the second sound) (FIG. 3: S13). In the example shown in FIG. 4, each of the audio data A, the audio data B, and the audio data C is compared with the analysis result D.

Next, the comparator 200*b*, in a case in which the analysis result of the environmental sound matches the audio data according to the second sound (FIG. 4: Yes in S13) excludes the audio data according to the second sound that matches the analysis result of the environmental sound, from the content data (FIG. 4: S14). In other words, the comparator 200*b* selects the audio data according to the second sound other than the audio data according to the second sound that matches the analysis result of the environmental sound. In the example shown in FIG. 4, the analysis result D matches the audio data B, so that the comparator 200*b* excludes the audio data B from the content data.

In a case in which no audio data according to the second sound matches the analysis result of the environmental sound as a result of comparison (FIG. 3: No in S13), the second sound is not excluded from the content data. The comparison between the data (the analysis result of the first sound) of the environmental sound and the audio data according to the second sound by the comparator 200*b* corresponds to first comparison in the present disclosure.

Next, the comparator 200*b* selects the audio data according to the second sound other than the excluded audio data (FIG. 3: S15). In a case of no excluded audio data (FIG. 3: No in S13), all the audio data according to the second sound is selected (FIG. 3: S16). In the example shown in FIG. 4, the audio data A and the audio data C are selected by the comparator 200*b*.

Next, the comparator 200*b* outputs selected audio data according to the second sound to the reproducer 200*c* (FIG. 3: S17). In the example shown in FIG. 4, the comparator 200*b* outputs the audio data A and the audio data C (the content data except the audio data B) to the reproducer 200*c*.

Next, the reproducer 200*c* decodes (reproduces) the content data inputted from the comparator 200*b*, and outputs the content data to the output I/F 203 as an audio signal. The output I/F 203 that receives an input of an audio signal outputs the audio signal to the headphones 30. The headphones 30 that receive an input of the audio signal outputs an inputted audio signal as sound. In the example shown in FIG. 4, the reproducer 200*c* respectively decodes the audio data A and the audio data C to an audio signal A2 and an audio signal C2. Then, the reproducer 200*c* outputs the decoded audio signal A2 and audio signal C2 to the headphones 30 through the output I/F 203. In other words, the reproducer 200*c* reproduces the audio data (the audio data according to the second sound) of which the type does not match the first sound (the environmental sound), based on a result of the first comparison.

Lastly, the headphones 30 that receive an input of the audio signal A2 and the audio signal C2 output a sound A3 based on the audio signal A2, and a sound C3 based on the audio signal C2. In other words, the headphones 30 output reproduced audio data (the audio data according to the second sound).

The sound processing apparatus 1 repeats the operation of S10 to S17. Accordingly, in a case in which the environmental sound that matches the second sound is playing, the headphones 30 do not output the second sound that matches the environmental sound. Then, in a case in which the environmental sound that matches the second sound is not playing, the headphones 30 output the second sound. In this manner, the sound processing apparatus 1 is able to switch whether or not to output the second sound, according to a change in the environmental sound.

With the above configuration, the sound processing apparatus 1 enables processing of sound to which a user can listen with a more immersive experience without a sense of discomfort. Hereinafter, the sound processing apparatus 1 and a sound processing apparatus (hereinafter, referred to as Comparative Example 1) which does not process a sound according to the present embodiment are compared and described. In comparison between the sound processing apparatus 1 and the sound processing apparatus according to Comparative Example 1, a case in which one river is around a user will be described as an example. In other words, the example includes a case in which one sound of a river is included in the environmental sound around the user and a case in which the sound of the river intrudes from the outside of the headphones 30 (headphones in a case of Comparative Example 1). That is to say, the user listens to the sound outputted from the headphones 30 (headphones in a case of Comparative Example 2) and the sound of the river being surrounding environmental sound.

Comparative Example 1 does not switch whether or not to output the sound from the headphones according to a change in the surrounding environmental sound. Accordingly, in a case in which the sound of the river is outputted from the headphones, the user listens to both of the sound (the sound of a river in a virtual space) of the river that is outputted from the headphones and the sound (the sound of the river) of the river that intrudes from the outside of the headphones. In other words, in Comparative Example 1, the user listens to sound obtained by overlapping the sound in a virtual space and the sound in a real space. On the other hand, the user visually recognizes one river. That is to say, a mismatch between visual information (a state in which the user can see one river) and auditory information (a state in which the user hears the sound of two rivers) in perception of the user occurs. Accordingly, in a case of Comparative Example 1, a sense of discomfort may be given to the user. As a result, a sense of immersion of the user may be reduced.

On the other hand, the sound processing apparatus 1 in the present embodiment switches whether or not to output sound from the headphones 30 according to a change in the surrounding environmental sound. Accordingly, in a case in which the sound of the river is included in the surrounding environmental sound, the sound processing apparatus 1 does not reproduce the audio data that includes the sound of the river. Therefore, the user, although listening to the sound of the river that intrudes from the outside of the headphones 30, does not listen to the sound of the river that is outputted from the headphones 30. In other words, the mismatch between visual information (a state in which the user can see one river) and auditory information (a state in which the user hears the sound of two rivers) in perception of the user does not occur. Accordingly, in a case of the sound processing apparatus 1, a sense of discomfort is less likely given to the user. As a result, a reduction in a sense of immersion of the user is able to be prevented.

Second Embodiment

Figure 6:
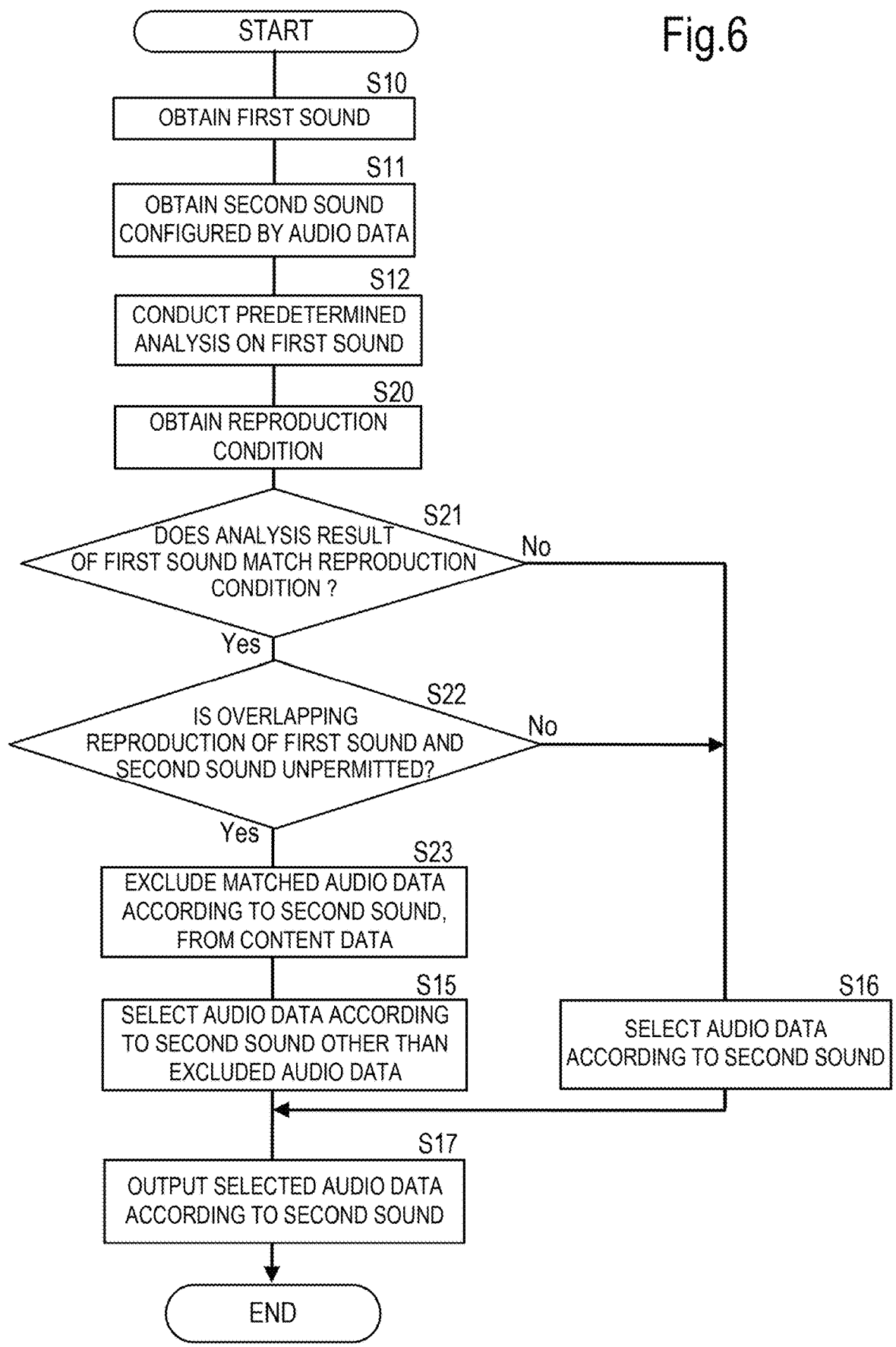
FIG. 6 is a flow chart showing an example of an operation of a sound processing apparatus 1a according to a second embodiment of the present disclosure.
Figure 7:
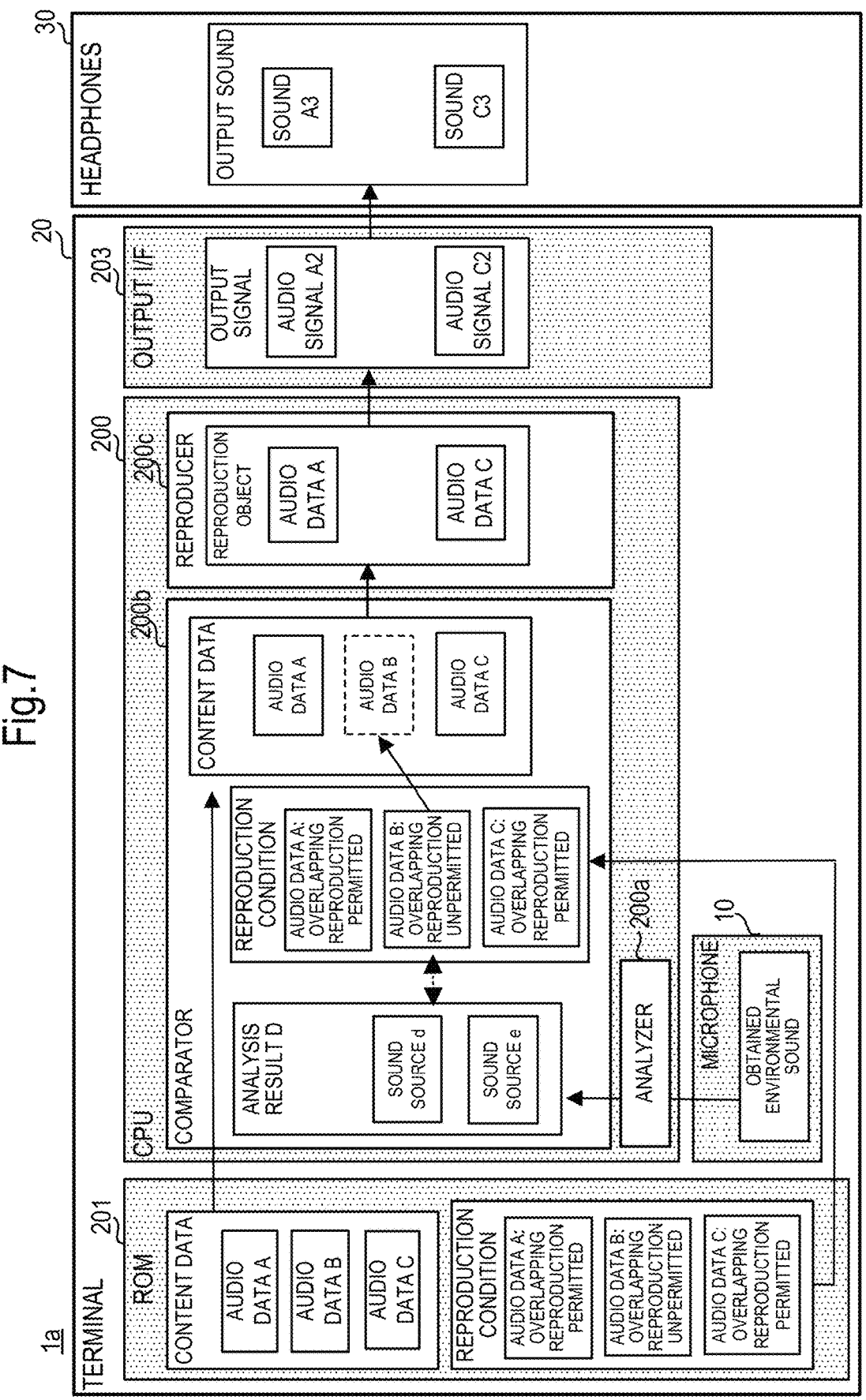
FIG. 7 is a view showing an example of movement of audio data in the sound processing apparatus 1a according to the second embodiment.

Hereinafter, a configuration of a sound processing apparatus 1a according to a second embodiment of the present disclosure will be described with reference to the drawings. FIG. 6 is a flow chart showing an example of an operation of the sound processing apparatus 1a according to the second embodiment of the present disclosure. FIG. 7 is a view showing an example of movement of audio data in the sound processing apparatus 1a according to the second embodiment.

As shown in FIG. 7, the sound processing apparatus 1a is different from the sound processing apparatus 1 in that whether or not the second sound is reproduced based on a reproduction condition created by a creator is determined.

The reproduction condition is data that records the reproduction condition of the second sound. Specifically, the reproduction condition is set to or not to permit overlapping reproduction of the environmental sound and the second sound. For example, in a case in which "the reproduction condition: overlapping reproduction is permitted" is set to the audio data according to the second sound, on the reproduction condition, the sound processing apparatus 1a outputs the audio data according to the second sound, regardless of the result of the comparison in the comparator 200b. On the other hand, in a case in which "the reproduction condition: overlapping reproduction is unpermitted" is set to the audio data according to the second sound, on the reproduction condition, the sound processing apparatus 1a does not output the same type of the audio data as the audio data of the environmental sound. The reproduction condition is obtained through the terminal 20 in the same manner that the second sound is obtained. After being obtained, the reproduction condition is stored in the ROM 201.

Hereinafter, a series of operations of the sound processing apparatus 1a will be described. It is to be noted that, in the example shown in FIG. 7, the audio data B is the same type of sound as a sound source d (one of the sound sources included in the environmental sound). It is to be noted that, in the example shown in FIG. 7, the audio data C is a different type of sound from each of the sound source d and a sound source e. It is to be noted that the processing of S11, S12, S15, S16, and S17 is similar to the processing in the sound processing apparatus 1, so that the description will be omitted.

The comparator 200b, after the predetermined analysis on the first sound in the analyzer 200a (FIG. 6: after S12), obtains the reproduction condition created in advance by the creator (FIG. 6: S20). In the example shown in FIG. 7, the comparator 200b obtains the reproduction condition (the audio data A: overlapping reproduction is permitted, the audio data B: overlapping reproduction is unpermitted, the audio data C: overlapping reproduction is permitted) from the ROM 201.

Next, the comparator 200b compares and determines whether the analysis result D matches the reproduction condition (FIG. 6: S21). Specifically, as shown in FIG. 7, the sound sources d and e included in the analysis result D in the comparator 200b are compared and determined to match the audio data A, B, and C included in the reproduction condition. For example, in a case in which the comparator 200b receives an input of the analysis result D that "the environmental sound is a sound of waves of the sea" from the analyzer 200a, and, in a case in which "the sound of waves of the sea" is set to the data included in the reproduction condition, the comparator 200b determines that the analysis result D of the environmental sound matches the reproduction condition. The comparison between analysis result of the first sound by the comparator 200b and the reproduction condition corresponds to second comparison in the present disclosure. It is to be noted that matching between the analysis result D and the reproduction condition means that information on the type of the environmental sound outputted by the analyzer 200a matches information on the type of the audio data, for example.

In a case in which data of the analysis result D of the environmental sound matches the reproduction condition (FIG. 6: Yes in S21), the comparator 200b determines whether or not overlapping reproduction of the data of the analysis result of the environmental sound and the audio data according to the second sound is permitted (FIG. 6: S22). For example, in a case in which the sound of waves matches the data of the analysis result of the environmental sound and the reproduction condition, the comparator 200b determines whether or not overlapping reproduction of the sound of waves is permitted based on the reproduction condition. In a case in which the analysis result of the environmental sound does not match the reproduction condition (FIG. 6: No in S21), the comparator 200b selects all the audio data according to the second sound (FIG. 6: S16).

In a case in which the comparator 200b determines that overlapping reproduction of the audio data is unpermitted based on the reproduction condition (FIG. 6: Yes in S22) the comparator 200b excludes the audio data (the audio data of which the type does not satisfy the reproduction condition) determined that overlapping reproduction is unpermitted, from the content data (FIG. 6: S23). For example, in a case in which the sound of waves matches the environmental sound data and the reproduction condition, the comparator 200b excludes the audio data of the sound of waves, from the content data. In the example shown in FIG. 7, the audio data B matches the sound source d. Therefore, the comparator 200b excludes the audio data B from the content data. Next, the comparator 200b selects audio data (audio data of which the type satisfies the reproduction condition) other than the excluded audio data (FIG. 6: S15). The comparator 200b, in a case of determining that overlapping reproduction of the sound is permitted based on the reproduction condition (FIG. 6: No in S22), selects the audio data according to the second sound (FIG. 6: S16).

Lastly, the comparator 200b outputs selected audio data to the reproducer 200c (FIG. 6: S17). It is to be noted that the processing after the comparator 200b outputs the selected audio data to the reproducer 200c is the same as the processing of the sound processing apparatus 1, so that the description will be omitted.

As a result, the sound processing apparatus 1a determines whether or not to reproduce the audio data according to the second sound, based on the reproduction condition. In the example shown in FIG. 7, the audio data B of which the overlapping reproduction is unpermitted is not reproduced. Accordingly, as shown in FIG. 7, in a case in which a creator has an intention not to desire to overlap and reproduce a specific sound, the creator can cause the sound processing apparatus 1a not to overlap or reproduce audio data including the specific sound by creating a reproduction condition.

With the above configuration, the sound processing apparatus 1a enables processing of sound to which a user can listen with a more immersive experience without a sense of discomfort. Specifically, the creator can cause sound that may be uncomfortable when overlapped to be reproduced without overlapping the sound. Hereinafter, a case in which the creator creates audio data of the sound of waves and audio data of the buzz of a cicada as content data, and a case in which the sound of waves and the buzz of a cicada are included as environmental sound will be described as an example.

In such a case, the creator, by setting a reproduction condition, can set not to reproduce sound considered to be problematic (uncomfortable) when overlapped and reproduced. Furthermore, the creator also can set to reproduce sound considered not to be problematic (comfortable) when overlapped and reproduced. In other words, the creator can select whether use the sound in the real space or the sound in the virtual space. For example, the creator, in a case of determining that the sound of waves gives discomfort to a user when the sound is overlapped and heard, sets up the audio data of the sound of waves to the reproduction condition: overlapping is unpermitted. In addition, the creator, in a case of determining that the buzz of a cicada gives no discomfort to a user when the sound is overlapped and heard, sets up the audio data of the buzz of a cicada to the reproduction condition: overlapping is permitted. In such a case, the user can listen to the sound in the real space as the sound of waves without overlapping, and can listen to the buzz (the buzz of a cicada in the real space and the buzz of a cicada in the virtual space) of a plurality of cicadas. That is to say, the sound processing apparatus 1a is able to use sound in a sound reproduction field and compensate for sound that seems to lack as the sound in the virtual space. As a result, the sound processing apparatus 1a is able to provide the user with content that the creator intends. Accordingly, in a case of the sound processing apparatus 1a, a sense of discomfort is less likely given to the user. As a result, a reduction in a sense of immersion of the user is able to be prevented.

Third Embodiment

Figure 8:
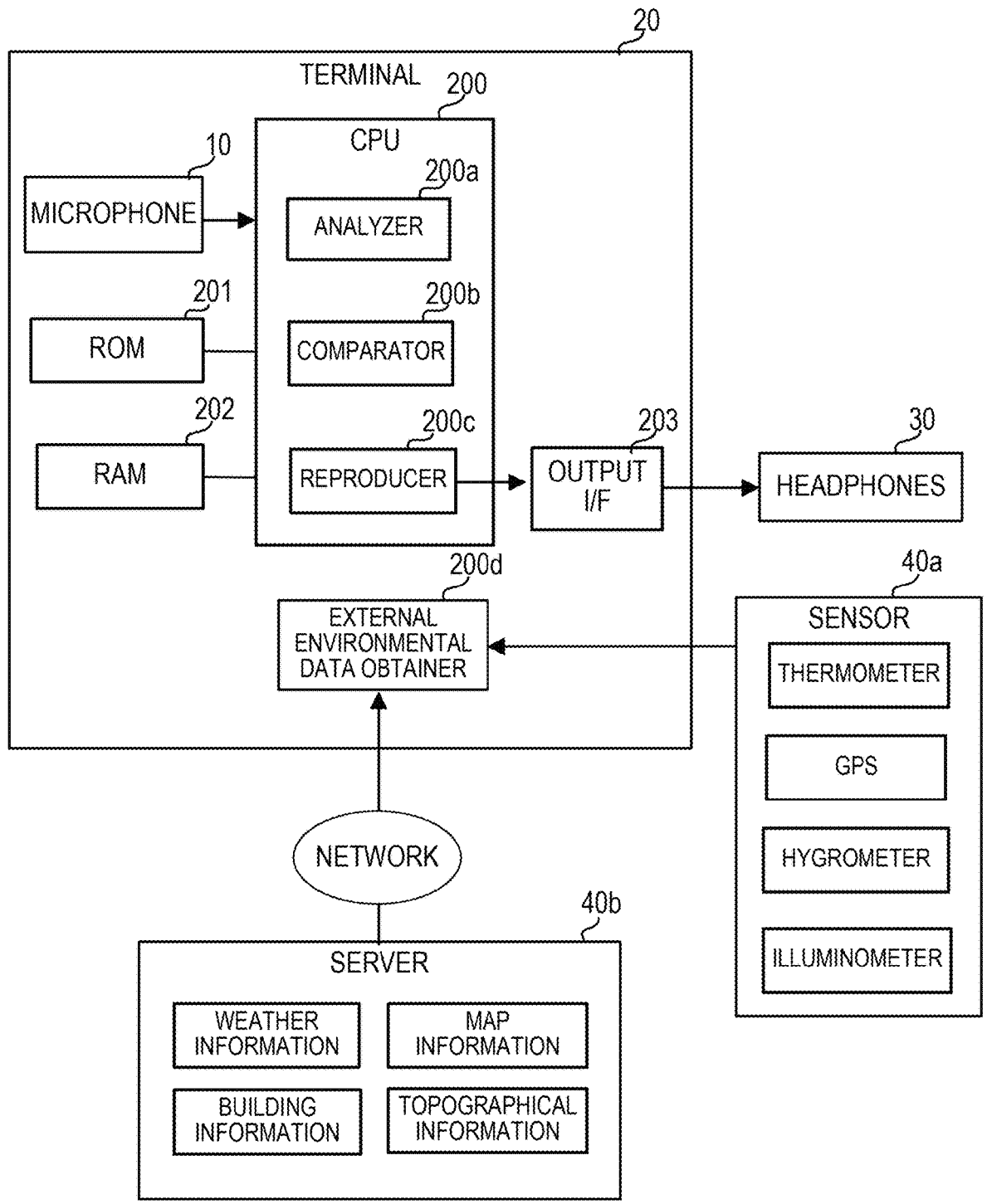
FIG. 8 is a block diagram showing an example of a main configuration of a sound processing apparatus 1b according to a third embodiment of the present disclosure.
Figure 10:
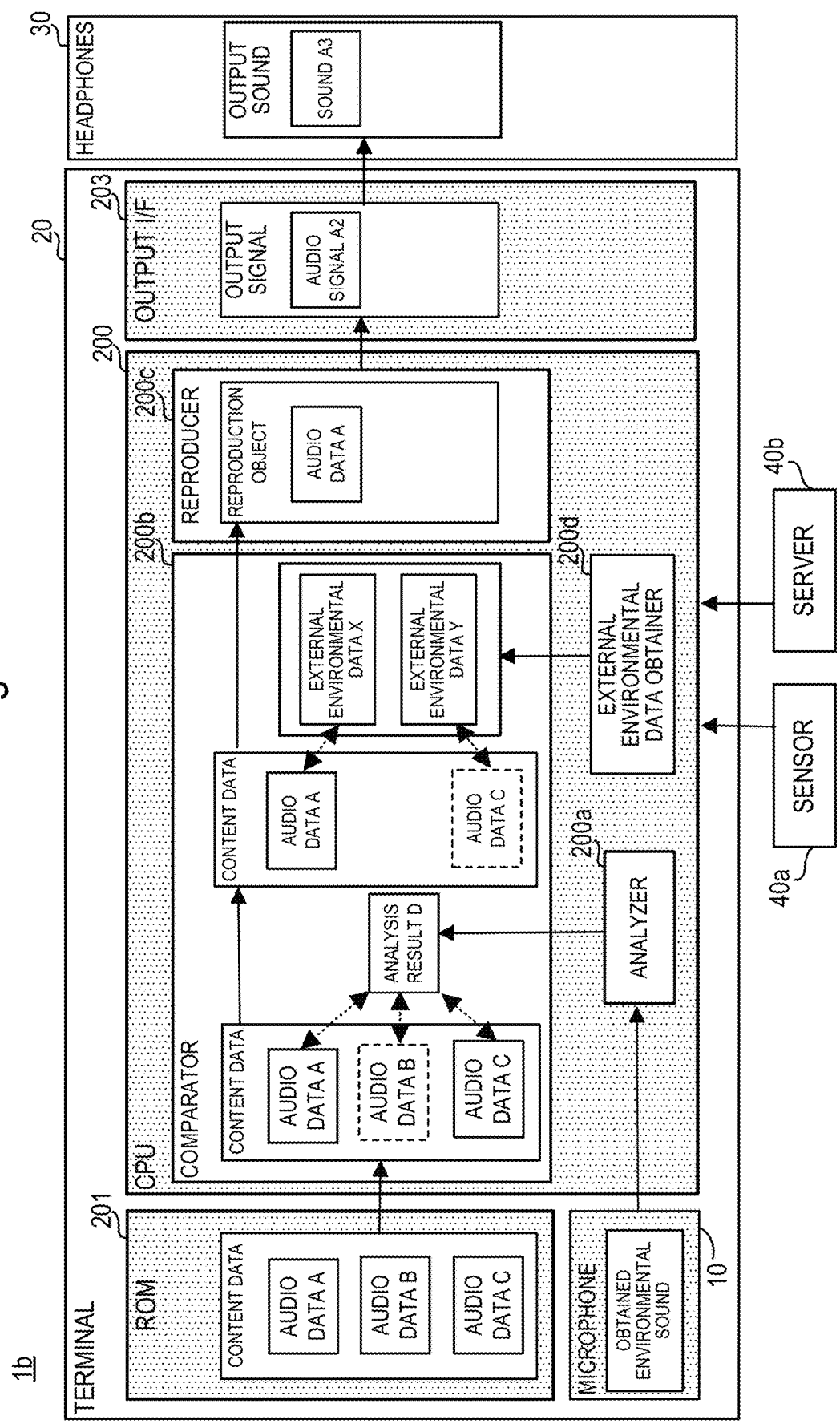
FIG. 10 is a view showing an example of movement of audio data in the sound processing apparatus 1b according to the third embodiment.

Hereinafter, a configuration of a sound processing apparatus 1b according to a third embodiment of the present disclosure will be described with reference to the drawings. FIG. 8 is a block diagram showing an example of a main configuration of the sound processing apparatus 1b according to the third embodiment of the present disclosure. FIG. 9 shows an image of an operation of the sound processing apparatus 1b according to the third embodiment. FIG. 10 is a view showing an example of movement of audio data in the sound processing apparatus 1b according to the third embodiment.

As shown in FIG. 8 and FIG. 10, the CPU 200 of the sound processing apparatus 1b is different from the CPU 200 of the sound processing apparatus 1 in that an external environmental data obtainer 200d is provided. In addition, as shown in FIG. 9, the sound processing apparatus 1b is different from the sound processing apparatus 1 in that obtained external environmental data and audio data according to the second sound are compared and in that sound according to the second audio data to be selected according to the external environmental data is selected.

The external environmental data obtainer 200d obtains data (hereinafter, referred to as external environmental data) of information on environment (environment around a user) around the terminal 20. As shown in FIG. 8, the external environmental data is obtained by a sensor 40a. The external environmental data obtainer 200d obtains the external environmental data from the sensor 40a. The sensor 40a includes a thermometer (temperature data), an illuminometer (illumination data), a hygrometer (humidity data), or a GPS (latitude and longitude data), for example. That is to say, the external environmental data includes information other than sound. The external environmental data obtainer 200d corresponds to an environmental data obtainer in the present disclosure. Such an external environmental data obtainer 200d is, for example, a communication interface such as a USB (Universal Serial Bus) or a network interface.

In addition, as shown in FIG. 8, the external environmental data obtainer 200d may obtain the external environmental data through a server 40b connected to a network. In such a case, the external environmental data obtainer 200d obtains weather information (temperature data, humidity data, or the like), map information (latitude and longitude data), or the like, from the server 40b, for example. The network is, specifically, a LAN (Local Area Network), a WAN (Wide Area Network), or the like.

It is to be noted that the server 40b is not limited to a source to obtain the external environmental data through the network. Specifically, the external environmental data obtainer 200d may obtain the external environmental data from a sensor connected through the network. For example, the source to obtain the external environmental data installs the terminal 20 indoors and installs a thermometer (being an example of a sensor) outdoors. At this time, the thermometer sends obtained data to the terminal 20 through a wireless LAN.

The comparator 200b of the sound processing apparatus 1b compares the obtained external environmental data with the audio data according to the second sound. Specifically, the sound processing apparatus 1b stores in advance an output condition (hereinafter, referred to as a condition between external environment and audio data) under which the second sound to be outputted is changed corresponding to the external environment. Then, in a case in which the external environmental data satisfies the condition between external environment and audio data, the sound processing apparatus 1b outputs the audio data. For example, in a case in which a temperature of 25 degrees or higher is set to sound of the buzz of a cicada as the condition between external environment and audio data, the sound processing apparatus 1b, when obtaining a value of the temperature of 25 degrees or higher from the external environmental data obtainer (the thermometer) 200*d*, outputs the sound of the buzz of a cicada.

Hereinafter, a series of operations of the sound processing apparatus 1*b* will be described. It is to be noted that the processing of S11 to S17 is similar to the processing in the sound processing apparatus 1, so that the description will be omitted.

The external environmental data obtainer 200*d*, after selecting the audio data according to the second sound (FIG. 9: after S15 or S16), obtains the external environmental data (FIG. 9: S30). In the example shown in FIG. 10, the external environmental data obtainer 200*d* obtains the external environmental data from the sensor 40*a* and the server 40*b*. The external environmental data obtainer 200*d* outputs obtained external environmental data to the comparator 200*b*. In the example shown in FIG. 10, the external environmental data obtainer 200*d* outputs external environmental data X and external environmental data Y to the comparator 200*b*.

Next, the comparator 200*b* compares the external environmental data with the condition between external environment and audio data (FIG. 9: S31). For example, in the example shown in FIG. 10, in a case in which the audio data A is audio data of the buzz of a cicada, a creator sets Season: Summer to the condition between external environment and audio data. Then, the sound processing apparatus 1*b* determines whether Season is Summer, based on the information (specifically, calendar information of a server, or the like) obtained from the external environmental data obtainer 200*d*.

In a case in which the external environmental data matches the condition between external environment and audio data (FIG. 9: Yes in S31), the comparator 200*b* selects audio data corresponding to the external environmental data (FIG. 9: S32). For example, in FIG. 10, in a case in which data of Season: Summer is obtained as the external environmental data X, and Season: Summer is set to the condition between external environment and audio data of the audio data A, the comparator 200*b* selects the audio data A.

On the other hand, in a case in which the external environmental data does not match the condition between external environmental and audio data (FIG. 9: No in S31), the comparator 200*b* does not select the audio data corresponding to the external environmental data (FIG. 9: S33). For example, in FIG. 10, in a case in which data of temperature: 25 degrees is obtained as the external environmental data Y, and temperature: 15 degrees or less is set to the condition between external environment and audio data of the audio data C, the comparator 200*b* does not select the audio data C.

Next, the comparator 200*b* outputs selected audio data to the reproducer 200*c* (FIG. 9: S17). In the example shown in FIG. 10, the comparator 200*b* outputs the audio data A to the reproducer 200*c*. It is to be noted that the processing after the comparator 200*b* outputs the selected audio data to the reproducer 200*c* is the same as the processing of the sound processing apparatus 1, so that the description will be omitted.

With the above configuration, the sound processing apparatus 1*b* enables processing of sound to which a user can listen with a further more immersive experience without a sense of discomfort. Specifically, the sound processing apparatus 1*b* is able to switch whether or not to output audio data according to a change in the external environment. Therefore, a possibility that audio data that is not in harmony with the external environment is outputted is reduced. Hereinafter, a case in which audio data includes data of a sound of a river will be described as an example. In such a case, the comparator 200*b*, by obtaining the map information around the terminal 20 from the external environmental data obtainer 200*d*, determines whether or not a river is around the terminal 20 (whether or not a river is in an obtained map). In a case in which a river is in the map, the sound processing apparatus 1*b* determines that a river is near the user. Then, the sound processing apparatus 1*b* does not output the audio data of the sound of a river in order not to overlap the sound of a river. In addition, in a case in which a state in which a river is in the obtained map information is changed to a state in which no river is in the information, due to movement of the user, the sound processing apparatus 1*b* determines that no river is near the user. Then, the sound processing apparatus 1*b* outputs the audio data of the sound of a river in order to prevent the sound of a river from lacking. Accordingly, the sound processing apparatus 1*b* enables the user to listen to sound required for the sound in the virtual space and the sound in the real space, without excess or deficiency. Accordingly, in a case of the sound processing apparatus 1*b*, a sense of discomfort is even less likely given to the user. As a result, a reduction in a sense of immersion of the user is able to be further prevented.

Fourth Embodiment

Figure 11:
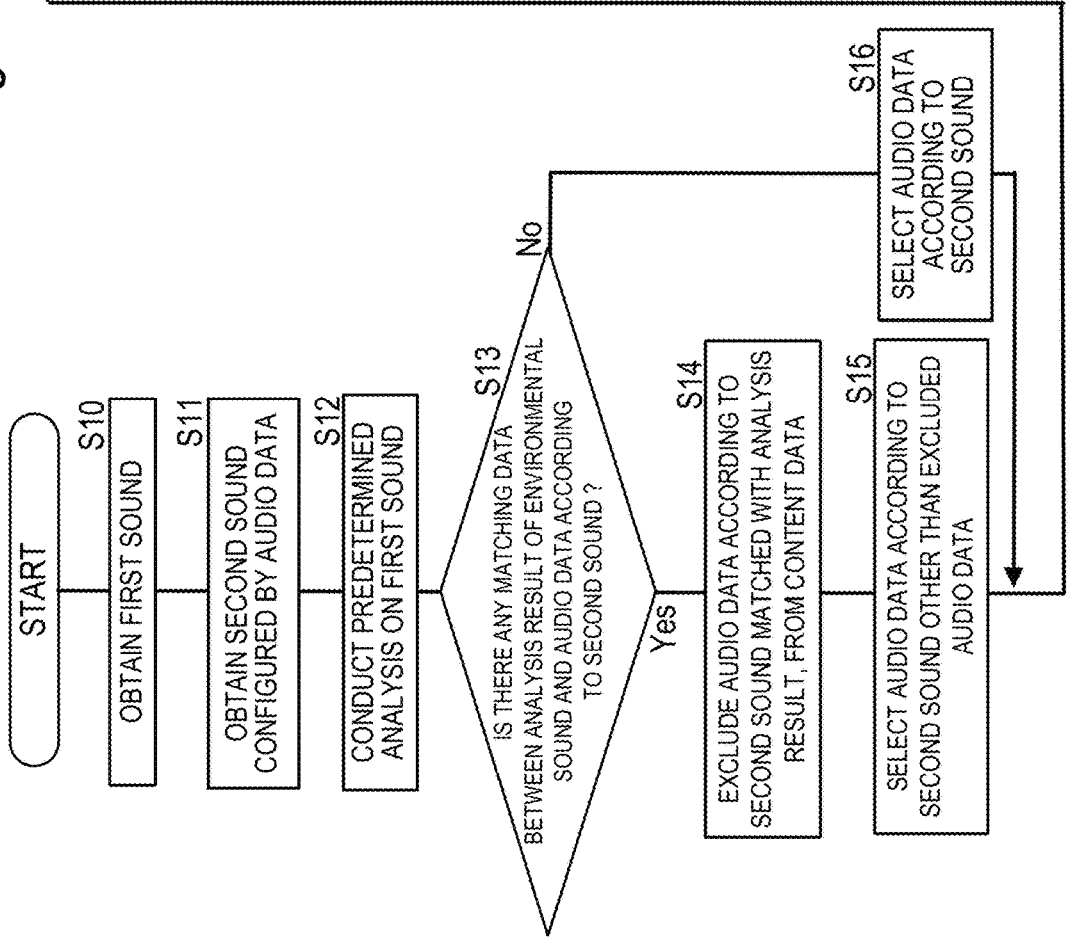
FIG. 11 is a flow chart showing an example of an operation of a sound processing apparatus 1c according to a fourth embodiment of the present disclosure.

Hereinafter, a configuration of a sound processing apparatus 1*c* according to a fourth embodiment of the present disclosure will be described with reference to the drawings. FIG. 11 is a flow chart showing an example of an operation of the sound processing apparatus 1*c* according to the fourth embodiment, and FIG. 12 is a view showing an example of movement of audio data in the sound processing apparatus 1*c* according to the fourth embodiment.

Figure 12:
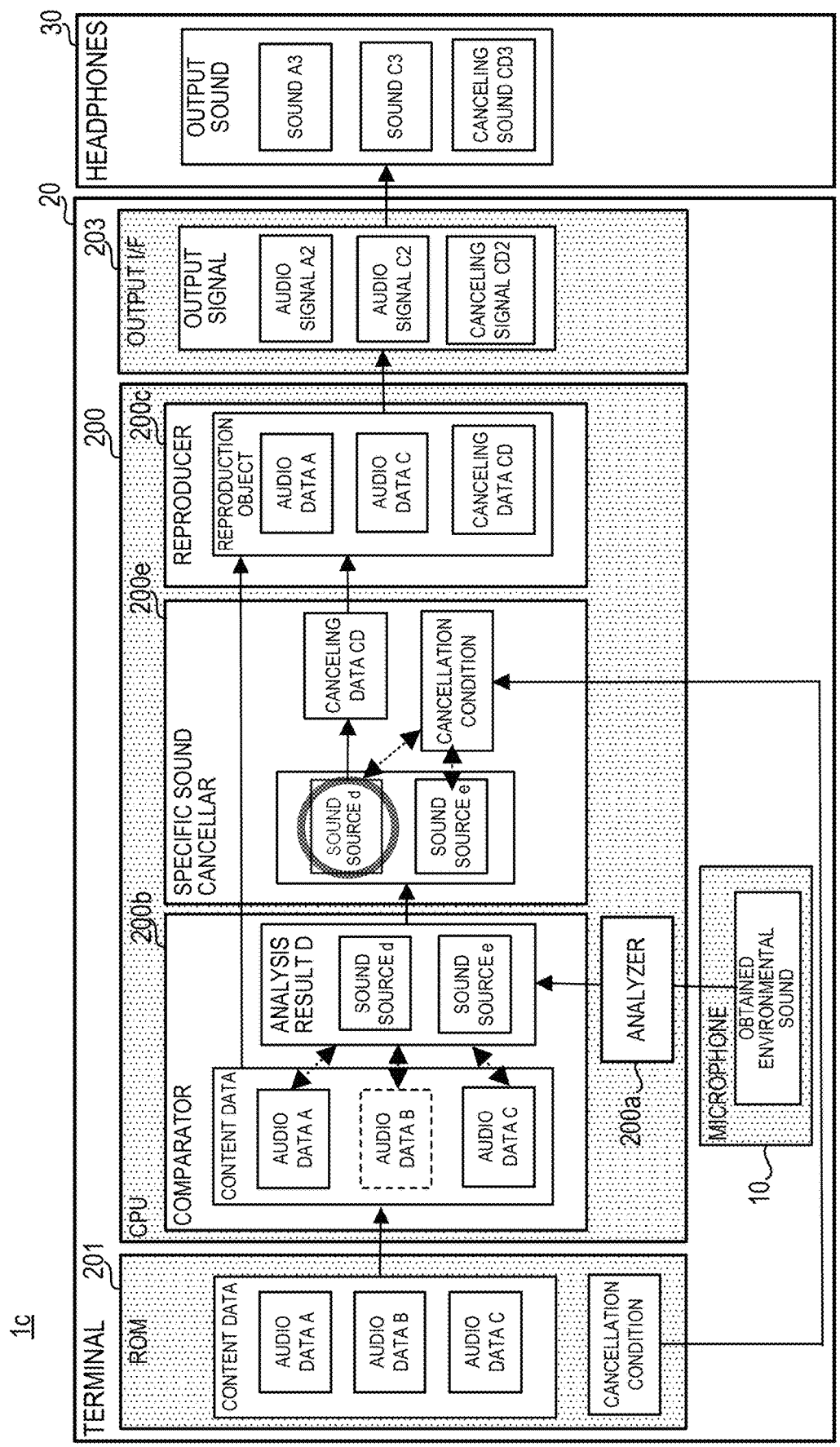
FIG. 12 is a view showing an example of movement of audio data in the sound processing apparatus 1c according to the fourth embodiment.

As shown in FIG. 12, the CPU 200 of the sound processing apparatus 1*c* is different from the CPU 200 of the sound processing apparatus 1 in that a specific sound canceller 200*e* is provided. In addition, as shown in FIG. 11, the sound processing apparatus 1*c* is different from the sound processing apparatus 1 in that a cancellation condition of environmental sound data is obtained. In addition, the sound processing apparatus 1*c* is different from the sound processing apparatus 1 in that whether environmental sound that matches a cancellation condition is present is compared. It is to be noted that, in FIG. 12, a sound source included in the environmental sound that matches the cancellation condition is surrounded by a circle.

The specific sound canceller 200*e* cancels a specific sound when the specific sound is included in the environmental sound. For example, the specific sound is an engine sound of a car. That is to say, the sound processing apparatus 1*c* cancels the specific sound that intrudes from the outside in a case in which the specific sound (the engine sound of a car, for example) is included in sound that intrudes from the outside of the headphones 30. For example, in a case in which the engine sound of a car is set as a specific sound to be canceled, the sound processing apparatus 1*c* performs an operation to cancel the engine sound of a car. The specific sound is canceled, for example, by outputting sound that has a phase opposite to the phase of the specific sound from the headphones 30.

The ROM 201 of the sound processing apparatus 1*c* stores the cancellation condition to which the condition to cancel a specific sound is set. For example, in a case in which the engine sound of a car is set to the cancellation condition, the sound processing apparatus 1*c* performs an operation to cancel the engine sound of a car as the specific sound to be canceled. The cancellation condition is stored in the terminal 20 in advance.

Hereinafter, a series of operations of the sound processing apparatus 1c will be described. It is to be noted that the processing of S11 to S16 is similar to the processing in the sound processing apparatus 1, so that the description will be omitted.

The specific sound canceller 200e, after selecting the audio data according to the second sound (FIG. 11: after S15 or S16), obtains the cancellation condition (FIG. 11: S40). In the example shown in FIG. 10, the specific sound canceller 200e obtains the cancellation condition from the ROM 201.

Next, the specific sound canceller 200e compares whether any environmental sound that matches the cancellation condition (whether any overlapping sound is present) is present (FIG. 11: S41). In the example shown in FIG. 12, the specific sound canceller 200e compares each of the sound sources d and e included in the analysis result D with the cancellation condition.

In a case in which a sound source that matches the cancellation condition is present (FIG. 11: Yes in S41), the specific sound canceller 200e creates cancelling data to cancel the sound source that matches the cancellation condition (S42). In the example shown in FIG. 12, the specific sound canceller 200e creates cancelling data CD, based on the sound source d that matches the cancellation condition. In a case in which no environmental sound data that matches the cancellation condition is present (FIG. 11: No in S41), the specific sound canceller 200e does not create the cancelling data.

Next, the specific sound canceller 200e outputs the cancelling data to the reproducer 200c. In the example shown in FIG. 12, the specific sound canceller 200e outputs the cancelling data CD to the reproducer 200c.

Next, the reproducer 200c outputs the audio data according to the second sound inputted from the comparator 200b and the cancelling data CD inputted from the specific sound canceller 200e, as an audio signal, to the headphones 30 (FIG. 11: S43). In the example shown in FIG. 12, the reproducer 200c outputs the audio data A and the audio data C (inputted from the comparator 200b), respectively, as the audio signal A2 and the audio signal C2, and the cancelling data CD (inputted from the specific sound canceller 200e) as a cancelling signal CD2, to the headphones 30.

Lastly, the headphones 30 output the sound A3 based on the audio signal A2, the sound C3 based on the audio signal C2, and a cancelling sound CD3 based on the cancelling signal CD2.

With the above configuration, the sound processing apparatus 1c enables processing of sound to which a user can listen with a further more immersive experience without a sense of discomfort. Specifically, the sound processing apparatus 1c, in a case in which noise sound is included in the external environmental sound, is able to cancel the noise sound. For example, a creator sets the engine sound (an example of the noise sound) of a car to the sound processing apparatus 1c, as a specific sound to cancel. In such a case, the sound processing apparatus 1c, in a case of determining that the engine sound of a car is included as external environmental sound, cancels the engine sound of a car. Accordingly, a user can experience content without the engine sound of a car to be noise. In this manner, the sound processing apparatus 1c prevents the user from losing a sense of immersion due to noise. Accordingly, in a case of the sound processing apparatus 1c, a sense of discomfort is even less likely given to the user. As a result, a reduction in the sense of immersion of the user is able to be further prevented.

In addition, the cancellation condition may be created by a content creator in advance. In such a case, the cancellation condition created by the creator is stored in the ROM 201. Then, the specific sound canceller 200e cancels the specific sound from the environmental sound, based on the cancellation condition created by the creator. In such a case, the user cannot hear the environmental sound that the creator does not intend. Accordingly, the user can listen to sound with a more immersive experience without a sense of discomfort.

Modified Example 1

Hereinafter, Modified Example 1 will be described. The use of sound processing apparatuses 1, 1a, 1b, and 1c according to Modified Example 1 makes it possible to record a sound of a sound source in a travel destination (hereinafter, referred to as a site), and to bring content back home based on recorded sound of the sound source, for example. For example, in a case in which a user goes to a specific location (Waikiki Beach in Hawaii, for example) while listening to specific content (tropical sound, for example) in travel, the sound processing apparatuses 1, 1a, 1b, and 1c record the sound of waves at Waikiki Beach. Then, the sound processing apparatus 1, in a case of reproducing the content of the same tropical sound next time, reproduces audio data of a recorded sound of waves at Waikiki Beach, instead of audio data of the sound of waves recorded in advance. In this manner, the sound processing apparatuses 1, 1a, 1b, and 1c are able to switch the sound to reproduce. As a result, the sound processing apparatuses 1, 1a, 1b, and 1c are able to motivate the user to go to a specific location.

Modified Example 2

Hereinafter, Modified Example 2 will be described. In Modified Example 2, the sound processing apparatuses 1, 1a, 1b, and 1c obtain multitrack content data by separating a plurality of pieces of audio data from sound obtained by mixing sounds from a plurality of sound sources. The sound processing apparatuses 1, 1a, 1b, and 1c according to Modification 2 divide the sound obtained by mixing sounds from the plurality of sound sources into a plurality of pieces of audio data by the publicly-known sound source separation technology, for example. In such a case, the publicly-known sound source separation technology includes BSS (Blind Signal Separation) or a nonlinear filter that separates a specific sound source through machine learning, for example.

Other Modified Examples

The terminal 20 (the second sound obtainer) may further obtain localization processing data used for processing of acoustic image localization according to the second sound. The localization processing data is, for example, information on a positional relationship between a sound source and a user in a virtual space (a three-dimensional space). As a result, it is possible to perform the acoustic image localization processing to localize sound at a predetermined position that a creator intends. For example, the creator, in a case of desiring to localize the sound of a river in the right direction relative to the position of the user, sets position information on audio data of the sound of a river in the right direction relative to the user. In such a case, the user can listen to the sound of a river as if the river were located in the right direction relative to the user. As a result, the user can naturally recognize the direction or the like of a surrounding object. Accordingly, the user can listen to sound with a more immersive experience without a sense of discomfort.

It is to be noted that, in a case in which the second sound is multitrack, the terminal 20 may obtain a switching condition of a track (audio data). The switching condition is set by the creator in advance through the terminal 20. In such a case, the sound processing apparatuses 1, 1a, 1b, and 1c reproduce the audio data of the track specified by the switching condition. Switching by the switching condition is, in a case in which a specific sound is included in the environmental sound, for example, switching of audio data using the specific sound as a trigger. Hereinafter, a case in which the sound processing apparatuses 1, 1a, 1b, and 1c have the conditions of (1) and (2) will be described as an example.

(1) a case in which the sound processing apparatuses 1, 1a, 1b, and 1c record audio data of a sound of waves and audio data of a sound of a whistle of a ship.

(2) a case in which the sound processing apparatuses 1, 1a, 1b, and 1c have a switching condition to switch the audio data of a sound of waves to the audio data of a sound of a whistle of a ship when obtaining a sound of waves in the real space.

Under the conditions of (1) and (2), the sound processing apparatuses 1, 1a, 1b, and 1c reproduce the audio data of the sound of waves when no sound of waves is present in the real space. That is to say, the user listens to the sound of waves in the virtual space. However, in a case in which the sound processing apparatuses 1, 1a, 1b, and 1c obtain the sound of waves in the real space, which matches the switching condition, the audio data is switched to the sound of the whistle of a ship. As a result, the user can listen to the sound of waves in the real space and the sound of the whistle of a ship in the virtual space. That is to say, the sound processing apparatuses 1, 1a, 1b, and 1c use the sound in the virtual space while using the sound in the real space as much as possible, and are thus able to increase a sense of immersion of the user. As a result, the sound processing apparatuses 1, 1a, 1b, and 1c are able to perform rendering to increase a sense of immersion without making the user aware of the rendering. In this manner, the sound processing apparatus 1, 1a, 1b, and 1c are able to output sound according to a scene to reproduce, by performing rendering to switch a plurality of second sounds. Accordingly, the user can listen to sound with a more immersive experience without a sense of discomfort. It is to be noted that, in the present Modified Example, the sound in the real space corresponds to the first sound, and the sound in the virtual space corresponds to the second sound.

It is to be noted that the microphone 10 may be connected to the terminal 20 through a wired connection. In such a case, even when the terminal 20 and the headphones 30 do not have the microphone 10, the terminal 20 is able to obtain the environmental sound by the microphone 10 connected through the wired connection.

It is to be noted that the terminal 20 may include an application program that is able to edit audio data. In such a case, for example, the user is able to edit audio data in real time by operating the terminal 20.

It is to be noted that the sound processing apparatuses 1, 1a, 1b, and 1c, in a case in which the type of the first sound matches the type of the second sound in the first comparison, may not reproduce the audio data according to the second sound of which the type matches the first sound and may output an obtained first sound to the headphones 30. In such a case, the headphones 30 include a hear-through mode in which sound obtained by the microphone of the own apparatus is outputted. In the hear-through mode, sound obtained by the microphone of the headphones 30 is outputted from the speaker of the headphones 30. In short, in this case, the headphones 30 output the environmental sound obtained by the microphone of the own apparatus and the second sound of which the type does not match the environmental sound. Hereinafter, a description will be made in detail with reference to FIG. 13. FIG. 13 is a view showing an example of an output of a first sound and reproduction of audio data. For example, as shown in FIG. 13, in a case in which the microphone 10 obtains the sound of the buzz of a cicada and the sound of the whistle of a ship, the headphones 30 output the sound of the buzz of a cicada and the sound of the whistle of a ship that are obtained by the microphone of the own apparatus. At this time, as shown in FIG. 13, in a case in which the audio data according to the second sound includes the buzz of a cicada, audio data being the buzz of a cicada is not reproduced. Then, as shown in FIG. 13, the sound of a river and the engine sound of a car being audio data that does not match the first sound are reproduced. As a result, the user can listen to the sound that the creator intends.

Figure 14:
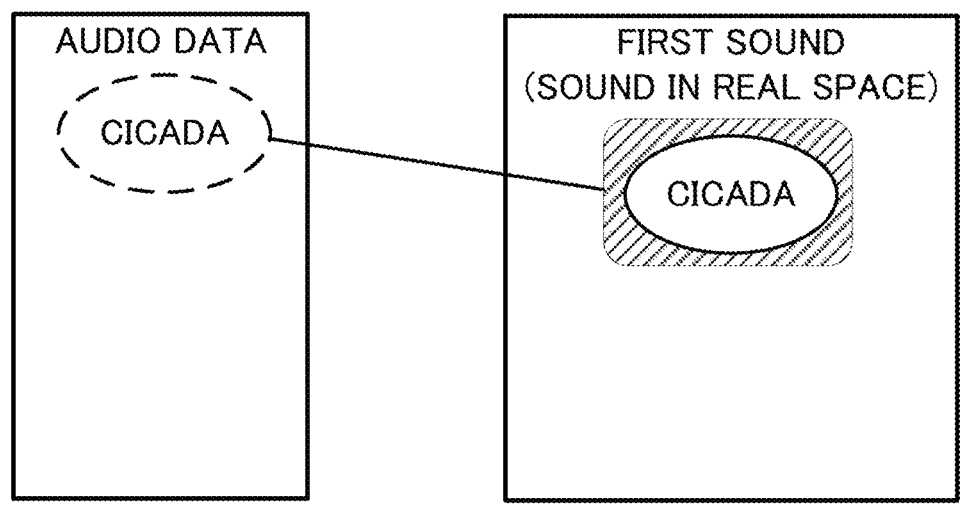
FIG. 14 is a view showing an example a case in which the sound processing apparatuses 1, 1a, 1b, and 1c do not reproduce the audio data.

It is to be noted that, in a case in which the headphones 30 include the hear-through mode, the sound processing apparatuses 1, 1a, 1b, and 1c do not necessarily have to reproduce the audio data (the user does not need to hear sound based on the audio data). Hereinafter, a description will be made in detail with reference to FIG. 14. FIG. 14 is a view showing an example a case in which the sound processing apparatuses 1, 1a, 1b, and 1c do not reproduce the audio data. As shown in FIG. 14, in a case in which only the buzz of a cicada is set as the audio data, and in a case in which the buzz of a cicada is obtained as the first sound, the sound processing apparatuses 1, 1a, 1b, and 1c do not reproduce the buzz of a cicada of the audio data. In such a case, the sound processing apparatuses 1, 1a, 1b, and 1c output only the buzz of a cicada in the real space. Accordingly, for example, in a case in which the buzz of a cicada in the real space continues being obtained for 30 seconds, the sound processing apparatuses 1, 1a, 1b, and 1c do not reproduce the audio data for 30 seconds. Then, when the buzz of a cicada in the real space is no longer obtained, the sound processing apparatuses 1, 1a, 1b, and 1c reproduce the audio data.

Figure 15:
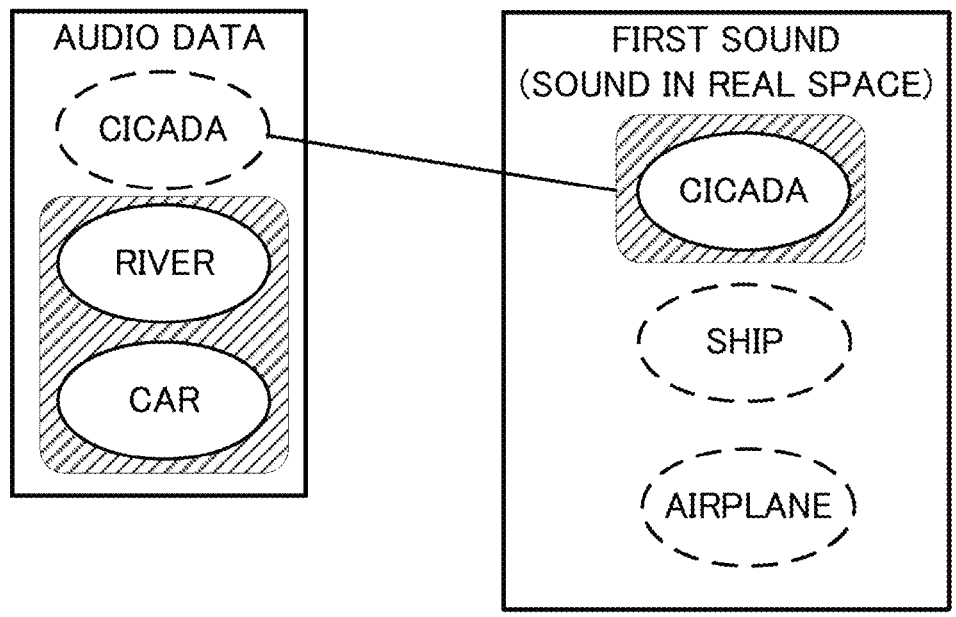
FIG. 15 is a view showing an example of cancellation of a sound of a sound source of which a type does not match a second sound among first sounds.

In addition, the sound processing apparatus 1, 1a, 1b, and 1c may cause the headphones 30 to cancel the sound of the sound source of which the type does not match the second sound among first sounds obtained by the microphone 10. Hereinafter, a description will be made in detail with reference to FIG. 15. FIG. 15 is a view showing an example of cancellation of a sound of a sound source of which the type does not match the second sound among the first sounds. For example, in a case in which the microphone 10 obtains the sound of the buzz of a cicada, the sound of the whistle of a ship, and the engine sound of an airplane and in a case in which the audio data according to the second sound includes the buzz of a cicada, the sound processing apparatuses 1, 1a, 1b, and 1c may cause the headphones 30 to perform processing to cancel the sound of the whistle of a ship and the engine sound (the sound that does not match the second sound) of an airplane. Alternatively, the sound processing apparatuses 1, 1a, 1b, and 1c may send an audio signal after canceling the sound of the whistle of a ship and the engine sound of an airplane from the sound obtained by the microphone 10, to the headphones 30, and may cause the headphones 30 to output the audio signal. As a result, the environmental sound to be outputted by the headphones 30 is only the buzz of a cicada. Accordingly, the sound processing apparatuses 1, 1a, 1b, and 1c are able to output only the environmental sound that the creator intends, while reproducing the audio data that the creator intends. As a result, the user can further listen to the sound that the creator intends. It is to be noted that, the sound processing apparatuses 1, 1a, 1b, and 1c, in a case of including the specific sound canceller 200e, may cancel the sound of the whistle of a ship and the engine sound of an airplane by the specific sound canceller 200e.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims of patent and within the meanings and scopes of equivalents.

What is claimed is:

1. A sound processing method for headphones, the method comprising:
    obtaining first audio data representing first sound from a microphone;
    obtaining second audio data representing second audio sound created in advance;
    analyzing the first audio data;
    comparing the second audio data with an analysis result of the analyzing;
    identifying a matching sound type in the second audio sound that matches a sound type in the first sound, based on a comparison result of the comparing;
    generate third audio data from non-matching sound types in the second audio sound by omitting the matching sound type in the second sound; and
    outputting an audio signal representing the generated third audio data.

2. The sound processing method according to claim 1, further comprising:
    emitting sound according to the output audio signal;
    obtaining a reproduction condition for the third audio data;
    comparing the reproduction condition with the analysis result of the analyzing,
    wherein the generating of the third audio data further include generating according to the reproduction condition and a comparison result of the comparing between reproduction condition and the analysis result of the analyzing.

3. The sound processing method according to claim 1, wherein:
    the analysis result includes first sound source information including a type of a first sound source included in the first sound, and
    the second audio data includes second sound source information including a type of a second sound source added in advance.

4. The sound processing method according to claim 1, further comprising, in a state where the matching sound type is not in the second sound, outputting the audio signal representing the first audio data as the third audio data.

5. The sound processing method according to claim 1, wherein:
    the first sound includes a plurality of sound sources, and
    the generating of the third audio data cancels sound of a first sound source, among the plurality of sound sources in the first sound, in a state where a matching sound type in the first sound source is not in the second sound; and
    the method further comprises generating fourth audio data including the first sound source, in a state where the matching sound type in the first sound source is in the second sound.

6. The sound processing method according to claim 1, further comprising:
    preparing a learned model in which a data set, which shows a relationship between first sound source information including a type of a first sound source and a feature amount of the first sound source, is learned as learning data;
    calculating the feature amount included in the first sound, in the analyzing of the first sound; and
    outputting the first sound source information corresponding to the feature amount as the analysis result of the first sound, by inputting the calculated feature amount into the learned model.

7. The sound processing method according to claim 1, further comprising:
    obtaining environmental data of surroundings,
    wherein the generating generates the third audio data based on the environmental data.

8. The sound processing method according to claim 1, further comprising, in a state where the first sound includes specific sound, cancelling the specific sound from the first sound.

9. The sound processing method according to claim 1, further comprising:
    obtaining a cancellation condition for cancelling specific sound created in advance; and
    cancelling the specific sound from the first sound based on the cancellation condition.

10. The sound processing method according to claim 1, further comprising obtaining localization processing data for processing of acoustic image localization according to the second sound.

11. The sound processing method according to claim 1, wherein:
    the second audio data is multitrack data,
    the method further comprises obtaining a switching condition for switching a track of the multitrack data, and
    the generating generates the third audio data further according to the type of the second sound satisfying the switching condition.

12. A sound processing apparatus comprising:
    a memory storing instructions; and
    a processor that implements the instructions to:
        obtain first audio data representing first sound;
        obtain second audio data representing second audio sound created in advance;
        analyze the first audio data;
        compare the second audio data with an analysis result of the first audio data;
        identify a matching sound type in the second audio sound that matches a sound type in the first sound, based on a comparison result of the compare;
        generate third audio data from non-matching sound types in the second audio sound by omitting the matching sound type in the second sound; and
        output an audio signal corresponding to the generated third audio data.

13. The sound processing apparatus according to claim 12, wherein:
  the sound processing apparatus is connectable to headphones that emit sound; and
  the processor implements the instructions to, in a state where a matching sound type is not in the second sound, output the audio signal representing the audio signal representing the first audio data as the third audio data to the headphones.

14. A sound processing system comprising:
  a headphone; and
  a sound processing apparatus comprising:
    a memory storing instructions; and
    a processor that implements the instructions to:
      obtain first audio data representing first sound;
      obtain second audio data representing second audio sound created in advance;
      analyze the first audio data;
      compare the second audio data with an analysis result of the first audio data;
      identify a matching sound type in the second audio sound that matches a sound type in the first sound, based on a comparison result of the compare;
      generate third audio data from non-matching sound types in the second audio sound by omitting the matching sound type in the second sound; and
      output an audio signal corresponding to the generated third audio data to the headphone.

15. The sound processing system according to claim 14, wherein the headphone includes a microphone that picks up the first sound and outputs the first audio data.

* * * * *